United States Patent
Hongu et al.

(10) Patent No.: US 9,843,728 B2
(45) Date of Patent: Dec. 12, 2017

(54) FOCUS CONTROL APPARATUS, CONTROL METHOD THEREFOR, STORAGE MEDIUM THEREFOR, AND IMAGE CAPTURING APPARATUS

(71) Applicant: CANON KABUSHIKI KAISHA, Tokyo (JP)

(72) Inventors: Hideyasu Hongu, Yokohama (JP); Makoto Yokozeki, Tokyo (JP); Hirofumi Honda, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 15/099,778

(22) Filed: Apr. 15, 2016

(65) Prior Publication Data

US 2016/0309089 A1    Oct. 20, 2016

(30) Foreign Application Priority Data

Apr. 20, 2015 (JP) ................................. 2015-086209

(51) Int. Cl.
*H04N 5/232* (2006.01)

(52) U.S. Cl.
CPC ..... *H04N 5/23245* (2013.01); *H04N 5/23212* (2013.01)

(58) Field of Classification Search
CPC ........................ H04N 5/23245; H04N 5/23212
See application file for complete search history.

(56) References Cited

U.S. PATENT DOCUMENTS

| 7,978,968 B2 * | 7/2011 | Sasaki | H04N 5/23212 |
| | | | 396/121 |
| 2008/0193115 A1 * | 8/2008 | Uenishi | G02B 7/08 |
| | | | 396/123 |

FOREIGN PATENT DOCUMENTS

| JP | 2003-241077 A | 8/2003 |
| JP | 2007-248615 A | 9/2007 |
| JP | 2010-097167 A | 4/2010 |

* cited by examiner

*Primary Examiner* — Twyler Haskins
*Assistant Examiner* — Fayez Bhuiyan
(74) *Attorney, Agent, or Firm* — Cowan, Liebowitz & Latman, P.C.

(57) ABSTRACT

A focus control apparatus having a first mode in which a position of a focus lens is automatically changed, and a second mode in which the position of the focus lens is manually changed, the focus control apparatus comprises: a setting unit configured to set a first area in the first mode and a second area in the second mode; a focus detection unit configured to detect a focus state based on signals output from areas of an image capturing unit; and a focus control unit configured to control the position of the focus lens in the first mode, wherein upon switching from the second mode to the first mode again, the setting unit sets the first area based on a second area that has been determined to be in an in-focus state.

13 Claims, 23 Drawing Sheets

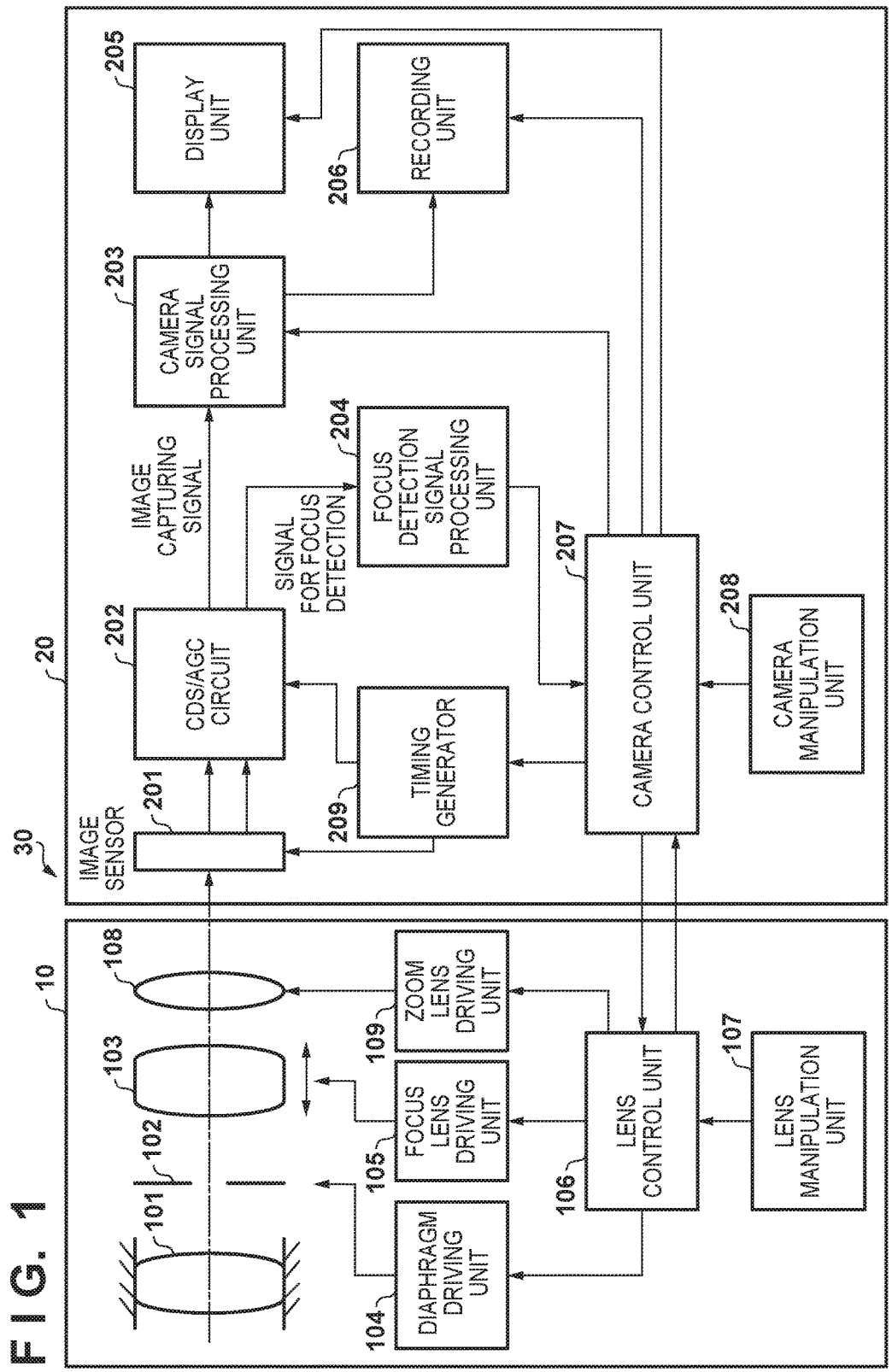

F I G. 2A

PIXEL STRUCTURE OF IMAGE SENSOR ACCORDING
TO METHOD OTHER THAN IMAGING SURFACE PHASE-DIFFERENCE METHOD

| R | Gr | R | Gr | R | Gr | R | Gr | R | Gr |
|---|----|---|----|---|----|---|----|---|----|
| Gb | B | Gb | B | Gb | B | Gb | B | Gb | B |

F I G. 2B

PIXEL STRUCTURE OF IMAGE SENSOR ACCORDING
TO IMAGING SURFACE PHASE-DIFFERENCE METHOD

| R A | R B | Gr A | Gr B | R A | R B | Gr A | Gr B | R A | R B | Gr A | Gr B | R A | R B | Gr A | Gr B | R A | R B | Gr A | Gr B |
|-----|-----|------|------|-----|-----|------|------|-----|-----|------|------|-----|-----|------|------|-----|-----|------|------|
| Gb A | Gb B | B A | B B | Gb A | Gb B | B A | B B | Gb A | Gb B | B A | B B | Gb A | Gb B | B A | B B | Gb A | Gb B | B A | B B |

F I G. 14A
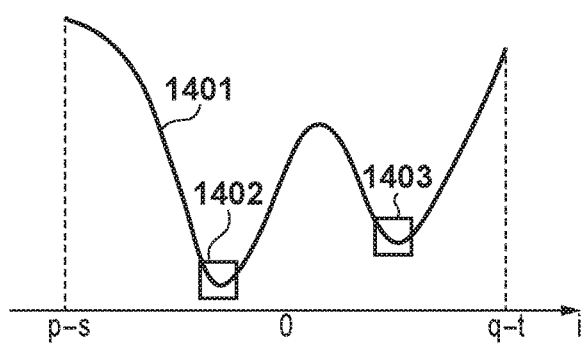
F I G. 14B
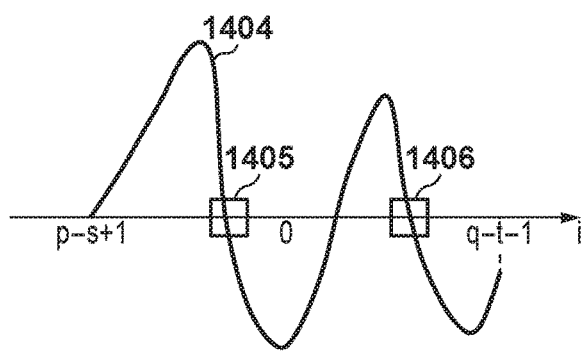
F I G. 14C
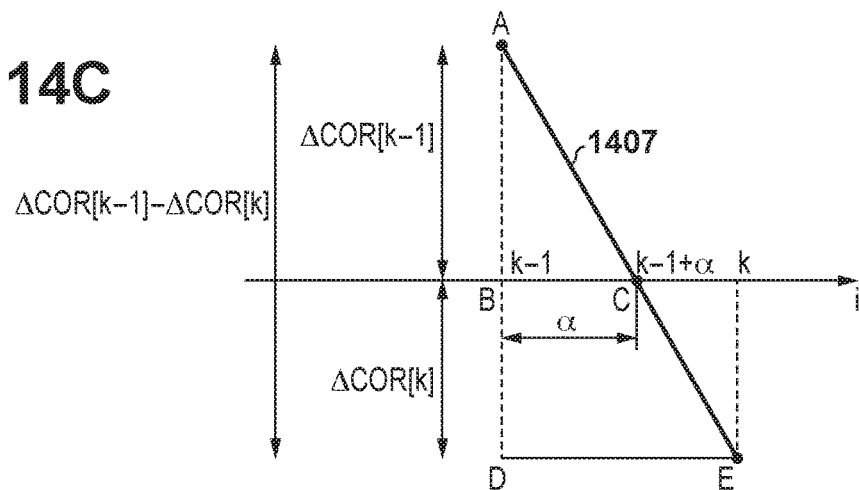
F I G. 14D
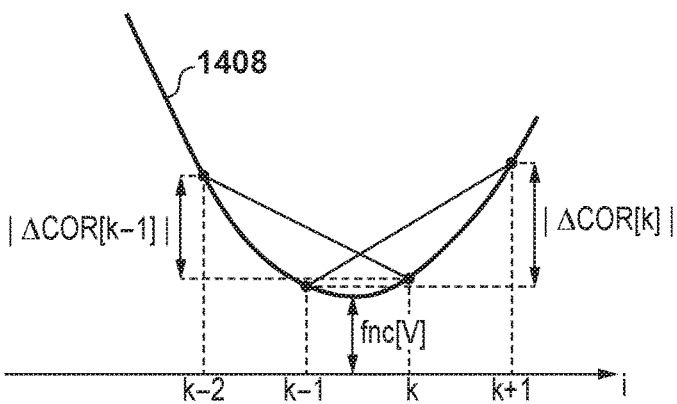

FOCUS CONTROL APPARATUS, CONTROL METHOD THEREFOR, STORAGE MEDIUM THEREFOR, AND IMAGE CAPTURING APPARATUS

BACKGROUND OF THE INVENTION

Field of the Invention

The present invention relates to a focus control apparatus, a control method therefor, a storage medium therefor, and an image capturing apparatus.

Description of the Related Art

It is not easy for a photographer to perform precise focus control with respect to a subject by manipulating manual focus (MF manipulation) on a focus control apparatus, such as a high-definition video camera supporting full high-definition, 4K, etc. Especially when performing focus control while checking a viewfinder, a panel, or the like, a slip in focus control may occur that cannot be checked on the viewfinder, the panel, or the like. To correct such a slip in focus control, MF assistance methods are suggested whereby an autofocus (AF) operation is performed after manipulating MF.

Japanese Patent Laid-Open No. 2003-241077 suggests a technique to, after detecting completion of MF manipulation and pressing of a release button or the like, perform only one session of detailed focus control through an AF operation within a minute range.

Japanese Patent Laid-Open No. 2010-97167 suggests a technique whereby a focus detection frame is automatically set to an area in an in-focus state among a plurality of focus detection areas set on a screen (areas targeted for AF), and if a subject moves on the screen afterwards, the subject is automatically tracked by the focus detection frame.

Japanese Patent Laid-Open No. 2007-248615 suggests a technique to display a bar showing an in-focus degree that is calculated while manipulating MF, so as to enable a user to easily check the state of a slip in focus control while manipulating MF.

However, with the technique of Japanese Patent Laid-Open No. 2003-241077, once focus control has been performed through AF, subtle shaking of a subject may bring a captured image slightly out of focus. With the technique of Japanese Patent Laid-Open No. 2010-97167, if a small focus detection frame is set, a moving subject easily deviates from the focus detection frame, thereby giving rise to the possibility that AF cannot be performed appropriately. The technique of Japanese Patent Laid-Open No. 2007-248615 does not take into consideration a case where a focus detection area for calculating an in-focus degree is dynamically changed by, for example, a user's selection; this may disable precise focus control with respect to a desired subject.

SUMMARY OF THE INVENTION

The present invention has been made in consideration of the aforementioned problems, and realizes a technique to enable appropriate focus control in accordance with a user's intention when there are a manual focus control mode and an automatic focus control mode.

In order to solve the aforementioned problems, the present invention provides a focus control apparatus having a first mode in which a position of a focus lens is automatically changed, and a second mode in which the position of the focus lens is manually changed, the focus control apparatus comprising: a setting unit configured to set a first area in the first mode and a second area in the second mode, as areas for obtaining signals used in focus detection; a focus detection unit configured to detect a focus state based on signals output from areas of an image capturing unit that correspond to the first area and the second area; and a focus control unit configured to control the position of the focus lens in the first mode based on the focus state of the first area detected by the focus detection unit, wherein upon switching from the first mode to the second mode, the setting unit sets a plurality of the second areas that are each smaller than the first area set in the first mode, and upon switching from the second mode to the first mode again, the setting unit sets the first area based on a second area that is included among the plurality of second areas and that has been determined to be in an in-focus state.

In order to solve the aforementioned problems, the present invention provides an image capturing apparatus, comprising: an image capturing unit; and a focus control apparatus having a first mode in which a position of a focus lens is automatically changed, and a second mode in which the position of the focus lens is manually changed, wherein the focus control apparatus includes: a setting unit configured to set a first area in the first mode and a second area in the second mode, as areas for obtaining signals used in focus detection; a focus detection unit configured to detect a focus state based on signals output from areas of the image capturing unit that correspond to the first area and the second area; and a focus control unit configured to control the position of the focus lens in the first mode based on the focus state of the first area detected by the focus detection unit, upon switching from the first mode to the second mode, the setting unit sets a plurality of the second areas that are each smaller than the first area set in the first mode, upon switching from the second mode to the first mode again, the setting unit sets the first area based on a second area that is included among the plurality of second areas and that has been determined to be in an in-focus state, the image capturing unit includes a plurality of pixels, each pixel having a plurality of photoelectric conversion areas corresponding to one microlens, and the focus detection unit detects the focus state based on signal pairs that are each output from a different one of the photoelectric conversion areas in the plurality of pixels.

In order to solve the aforementioned problems, the present invention provides a control method of a focus control apparatus having a first mode in which a position of a focus lens is automatically changed, and a second mode in which the position of the focus lens is manually changed, the control method comprising: setting a first area in the first mode and a second area in the second mode, as areas for obtaining signals used in focus detection; detecting a focus state based on signals output from areas of an image capturing unit that correspond to the first area and the second area; and controlling the position of the focus lens in the first mode based on the detected focus state of the first area, wherein upon switching from the first mode to the second mode, a plurality of the second areas are set, the plurality of second areas each being smaller than the first area set in the first mode, and upon switching from the second mode to the first mode again, the first area is set based on a second area that is included among the plurality of second areas and that has been determined to be in an in-focus state.

In order to solve the aforementioned problems, the present invention provides a non-transitory computer-readable storage medium storing a program for causing a computer to execute a control method of a focus control apparatus having a first mode in which a position of a focus lens is automatically changed, and a second mode in which the position of the focus lens is manually changed, the control method comprising: setting a first area in the first mode and a second area in the second mode, as areas for obtaining signals used in focus detection; detecting a focus state based on signals output from areas of an image capturing unit that correspond to the first area and the second area; and controlling the position of the focus lens in the first mode based on the detected focus state of the first area, wherein upon switching from the first mode to the second mode, a plurality of the second areas are set, the plurality of second areas each being smaller than the first area set in the first mode, and upon switching from the second mode to the first mode again, the first area is set based on a second area that is included among the plurality of second areas and that has been determined to be in an in-focus state.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate an embodiment(s) of the invention, and together with the description, serve to explain the principles of the invention.

FIG. 1 is a block diagram showing an exemplary functional configuration of one example of a focus control apparatus according to an embodiment of the present invention, specifically, a camera body and a lens unit.

FIGS. 2A and 2B illustrate an exemplary pixel structure of an imaging surface phase-difference detection method according to the present embodiment.

FIGS. 14A to 14D illustrate a correlation computation method according to the present embodiment.

DESCRIPTION OF THE EMBODIMENTS

First Embodiment

The following describes an exemplary embodiment of the present invention in detail with reference to the drawings. The following description provides an example in which the present invention is applied to an arbitrary digital camera capable of focus control as one example of a focus control apparatus. However, the present invention is not limited to being applied to a digital camera and is applicable to any electronic device capable of focus control, and examples of such a device may include an information terminal (e.g., a mobile telephone, a personal computer, a tablet, a clock-type device, or an eyeglass-type device), and a vehicle-mounted device. Furthermore, although a body of a digital camera described in the present embodiment includes a display unit and a manipulation unit that enables manipulation of MF, the display unit and the manipulation unit may be externally provided, and manual manipulation may be performed through remote control.

Overview of Present Embodiment

Figure 23A:
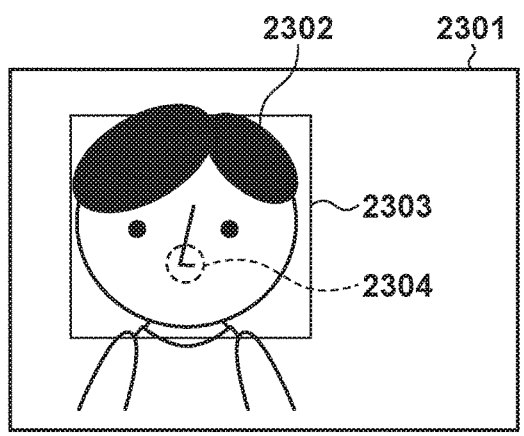
FIGS. 23A to 23D illustrate an overview of the present embodiment.

Before giving a detailed description of the present embodiment, an overview of the present embodiment will now be described with reference to FIGS. 23A to 23D. FIG. 23A shows a predetermined frame of a video capturing a subject. A screen 2301 shows a captured subject 2302. In this case, an AF frame is set for the subject 2302 based on a face frame 2303, and AF control is performed using AF evaluation values generated from image signals obtained within the AF frame. However, as the AF frame is set to cover the entire face, performing AF based on the AF evaluation values may result in focus on a high-contrast portion, or on a portion 2304 (specifically, the nose) that is closest from a camera in the case of AF with closest subject priority, within the face frame 2303. In general, when capturing a person, an eye is often focused on during focus control, and therefore using the AF evaluation values within the AF frame that has been set based on the face frame 2303 may result in focus control that is not in line with a user's intention.

In this case, the user can perform focus control by manipulating MF; however, if AF operates again after such focus control, the closest portion, such as the noise, may be focused on again when the AF frame is set at the face frame.

Figure 23B:
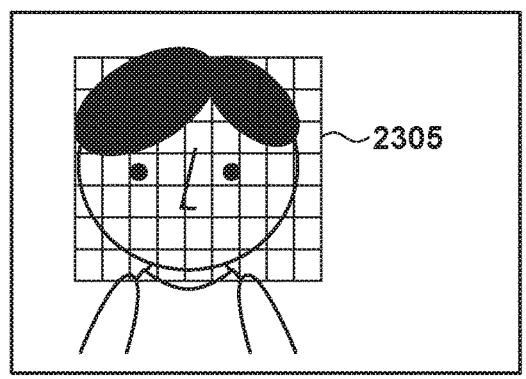
Figure 23C:
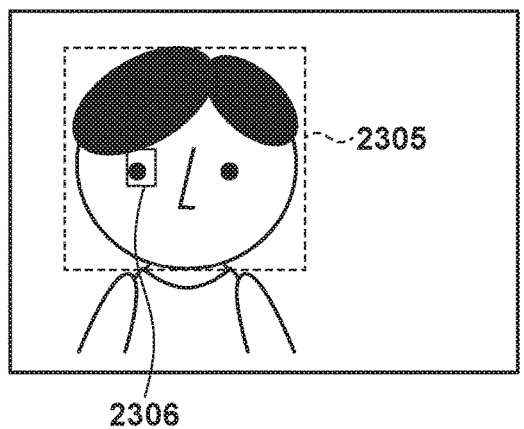
Figure 23D:
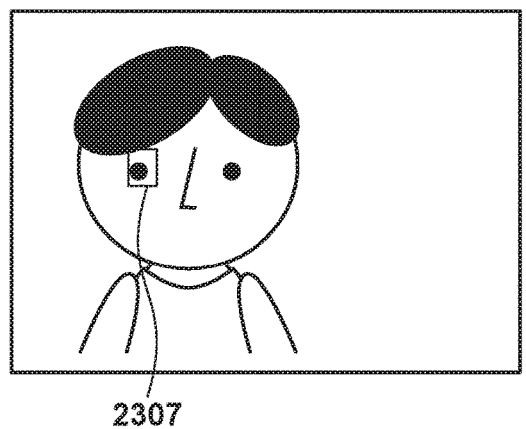

In view of this, in the present embodiment, as shown in FIG. 23B, segment frames 2305 having a higher level of segmentation than the AF frame are set as focus detection frames while manipulating MF. Focus detection information is obtained from each of the segment frames 2305, and as shown in FIG. 23C, an in-focus display frame 2306 is displayed only at a portion that is in focus. Subsequently, an AF operation is performed with an AF frame set based on the focus detection frame that has been focused on by manipulating MF. As a result, a portion that the user tried to focus on by manipulating MF can be focused on also after the AF operation. That is to say, upon returning to the AF operation, as shown in FIG. 23D, an AF frame 2307 is set at the same area as the in-focus display frame 2306; this makes it possible to maintain the state where, for example, an eye of a person is in focus.

However, even with the foregoing technique, a significant movement of the subject may cause the subject to deviate from the focus detection frame that has already been focused on by an MF operation. This may result in a situation where an AF frame that has been set based on such a focus detection frame covers an unintended subject, thereby focusing on the unintended subject. Consequently, if the image features satisfy a predetermined condition(s), it is determined that the AF frame has deviated from the subject, and the intended AF is continuously performed by enlarging the AF frame to the face frame 2303 shown in FIG. 23A. The present embodiment will now be described in detail.

(Configuration of Digital Camera)

FIG. 1 is a block diagram showing an exemplary functional configuration of one example of a focus control apparatus according to the present embodiment, specifically, a digital interchangeable lens camera that includes a lens unit and a camera body. Note that at least one of function blocks shown in FIG. 1 may be realized by hardware, such as an ASIC and a programmable logic array (PLA), or may be realized by execution of software by a programmable processor, such as a CPU and an MPU. Alternatively, at least one of the function blocks may be realized by a combination of software and hardware. Therefore, operations that are explained to be executed by different function blocks in the following description may be executed by the same hardware.

FIG. 1 is a block diagram showing a configuration of a digital camera according to the present embodiment. A digital camera 30 is composed of a lens unit 10 and a camera body 20. A lens control unit 106 that controls the entire operations of the lens unit 10 and a camera control unit 207 that controls the entire operations of the camera body 20 perform data communication via a non-illustrated transmission channel, such as a bus. Although the lens unit 10 is configured as an exchangeable lens system that is attachable to and detachable from the camera body 20 in the description of the present embodiment, the lens unit 10 and the camera body 20 may be integrated.

<Configuration of Lens Unit 10>

The lens unit 10 includes an imaging optical system composed of a fixed lens 101, a zoom lens 108, a diaphragm 102, and a focus lens 103. The diaphragm 102 is driven by a diaphragm driving unit 104, and controls an amount of light incident on a later-described image sensor 201. The focus lens 103 is driven by a focus lens driving unit 105, and is moved on an optical axis, either automatically or manually, to perform focus control. More specifically, an image formation position of an optical image of a subject incident on the image sensor 201 is changed in an optical axis direction by controlling a position of the focus lens 103. The zoom lens 108 is driven by a zoom lens driving unit 109 to control a zoom position.

The diaphragm driving unit 104, the focus lens driving unit 105, and the zoom lens driving unit 109 are controlled by the lens control unit 106 to decide on an aperture of the diaphragm 102 and the positions of the focus lens 103 and the zoom lens 108. When a user manipulates focus, zoom, and the like via a lens manipulation unit 107, the lens control unit 106 performs control according to the user's manipulation. The lens control unit 106 controls the diaphragm driving unit 104, the focus lens driving unit 105, and the zoom lens driving unit 109 in accordance with a control command and control information received from the later-described camera control unit 207, and thereafter transmits lens information to the camera control unit 207.

<Configuration of Camera Body 20>

The camera body 20 can obtain image capturing signals from a beam of light that has passed through the imaging optical system of the lens unit 10. The image sensor 201 is constituted by, for example, a CCD sensor or a CMOS sensor. A beam of light that has passed through the imaging optical system forms an image on a light receiving surface of the image sensor 201, and the formed image of the subject is converted by photodiodes into charges corresponding to an amount of incident light (photoelectric conversion). In accordance with an instruction from the camera control unit 207 and driving pulses fed from a timing generator 209, the charges accumulated in the photodiodes are sequentially read out from the image sensor 201 as voltage signals corresponding to the amounts of the charges.

An image sensor that does not support focus detection according to an imaging surface phase-difference method has a pixel structure with a Bayer array as shown in, for example, FIG. 2A. On the other hand, as shown in FIG. 2B, the image sensor 201 according to the present embodiment has a plurality of (in the present embodiment, two) photodiodes (photoelectric conversion areas) per pixel to perform focus detection according to the imaging surface phase-difference method. A beam of light is divided by a microlens that is provided in the vicinity of two photodiodes, and each of the two photodiodes photoelectrically converts the image of the subject; in this way, a signal for image capture and two signals for focus detection can be obtained. A sum of signals from the two photodiodes (A+B) serves as the image capturing signal, and signals from the individual photodiodes (A, B) serve as the two image signals for focus detection.

Note that the configuration in which each of the two image signals is read out, which is described in the present embodiment by way of example, may be replaced by other configurations. For example, in consideration of processing load, it is permissible to adopt a configuration in which the sum of signals (A+B) and one of the image signals (e.g., A) are read out, and the other of the image signals (e.g., B) is obtained from a difference between the signals that have been read out. In the present embodiment, correlation computation is carried out with respect to the two image signals thus obtained for focus detection so as to calculate an image shift amount (also referred to as an out-of-focus amount or a focus state) and various types of reliability information as a result of focus detection.

Furthermore, although two photodiodes are provided per pixel in the present embodiment, two or more photodiodes may be provided per pixel. Moreover, an image sensor that supports focus detection according to the imaging surface phase-difference method is not limited to having a plurality of photodiodes per pixel as in the present embodiment, and may include pixels for focus detection as in Japanese Patent Laid-Open No. 2010-97167 mentioned earlier.

The image capturing signals and the signals for focus detection that have been read out from the image sensor 201 are input to a CDS/AGC circuit 202 to perform correlated double sampling for removing reset noise, control gain, and digitalize signals. The CDS/AGC circuit 202 outputs the image capturing signals to a camera signal processing unit 203, and outputs the signals for focus detection according to the imaging surface phase-difference method (hereinafter also referred to simply as focus detection signals) to a focus detection signal processing unit 204.

The camera signal processing unit 203 transmits the image capturing signals output from the CDS/AGC circuit 202 to a display unit 205. The display unit 205 is a display device, such as an LCD and an organic EL display, and displays the image capturing signals. In a mode for recording the image capturing signals, the image capturing signals are recorded to a recording unit 206.

The focus detection signal processing unit 204 obtains two image signals for focus detection from the CDS/AGC circuit 202, and carries out correlation computation with respect to the image signals to calculate an image shift amount and reliability information (a degree of match between two images, a degree of steepness exhibited by two images, contrast information, saturation information, scratch information, and the like). Then, it outputs the calculated image shift amount and reliability information to the camera control unit 207. The details of correlation computation will be described later.

The camera control unit 207 is, for example, a CPU or an MPU, and controls various components of the camera body 20 by deploying a program stored in an internal ROM to a working area for a RAM and executing the deployed program. As this time, the camera control unit 207 exchanges information with various components. It also executes a camera function corresponding to the user's manipulation in accordance with input from a camera manipulation unit 208; examples of the user's manipulation include turning ON/OFF power, changing a setting, starting recording, starting AF control, checking a recorded image, and selecting an AF frame. The camera control unit 207 has a mode switching unit that switches between focus control modes (AF and MF) in accordance with input via the camera manipulation unit 208. The camera control unit 207 exchanges information with the lens control unit 106 in the lens unit 10, specifically, transmits a control command and control information for controlling the imaging optical system based on a focus state (focus control), and obtains information within the lens unit. The camera control unit 207 also performs display control to display, on the display unit 205, an AF frame or a later-described combined frame superimposed over the image capturing signals. Note that the camera control unit 207 may receive, as input, the image signals for focus detection directly from the CDS/AGC circuit 202, and execute processing executed by the focus detection signal processing unit 204.

(Operations for Image Capturing Processing in Camera Body 20)

Figure 3:
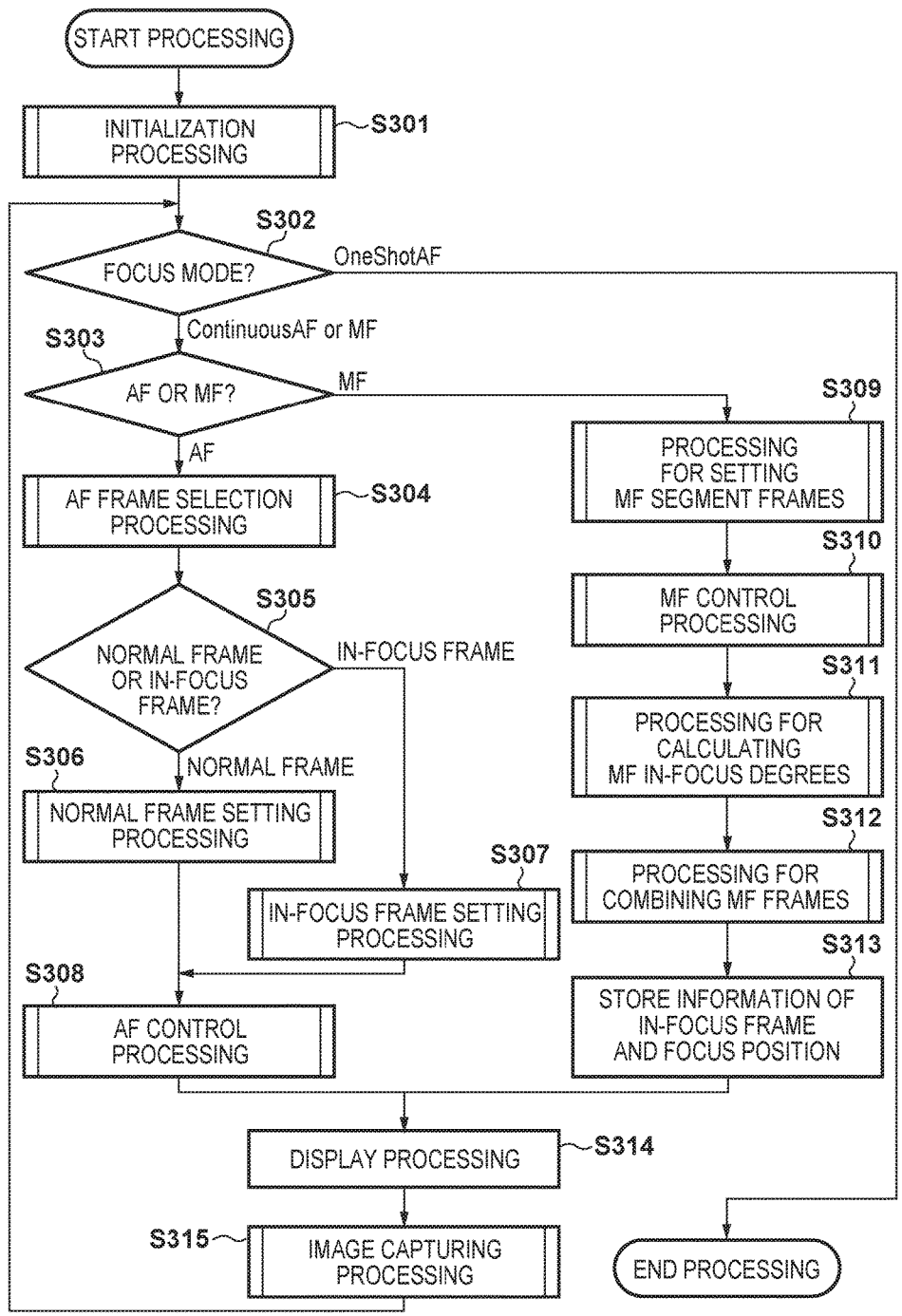
FIG. 3 is a flowchart showing a sequence of operations for image capturing processing according to the present embodiment.

A description is now given of a sequence of operations for image capturing processing in the camera body 20 with reference to FIG. 3. FIG. 3 is a flowchart showing an image capturing processing sequence according to the present embodiment. Note that the present processing is started when, for example, the user instructs the camera manipulation unit 208 to start the image capturing processing or change an image capturing mode. The present processing is realized by the camera control unit 207 deploying a program stored in the ROM to the working area for the RAM and executing the deployed program.

In step S301, the camera control unit 207 executes initialization processing, and then proceeds to step S302. The details of the initialization processing will be described later with reference to FIG. 11. In step S302, the camera control unit 207 determines a focus mode. If the focus mode is set to a OneShotAF mode (AF control is performed only once), the present processing sequence is ended. On the other hand, if the focus mode is not the OneShotAF mode, that is to say, if the focus mode is ContinuousAF (AF control is performed continuously) or manual (MF manipulation), processing proceeds to step S303. In the following description, processing executed during OneShotAF will be omitted.

In step S303, the camera control unit 207 determines whether a focus control mode is automatic (AF operation) or manual (MF manipulation); if the focus control mode is set to AF, processing proceeds to step S304, and if not, processing proceeds to step S309.

In step S304, the camera control unit 207 executes AF frame selection processing for setting an AF frame. The AF frame selection processing is processing for deciding on one of the following frames as a basis for selection of the AF frame: a focus detection frame that was determined to be in focus while manipulating MF in later-described step S313 (hereinafter also referred to as an in-focus frame), and a normal AF frame (hereinafter also referred to as a normal frame). In step S305, whether the frame selected in step S304 is the normal frame or the in-focus frame is determined; if the selected frame is the normal frame, processing proceeds to step S306, and if the selected frame is the in-focus frame, processing proceeds to step S307.

In step S306, the camera control unit 207 sets the AF frame at the position of the selected normal frame. The details will be described later with reference to FIG. 16A. On the other hand, in step S307, the camera control unit 207 sets the AF frame at the position of the in-focus frame. The details will be described later with reference to FIG. 16B.

In step S308, the focus detection signal processing unit 204 and the camera control unit 207 execute AF control processing using the AF frame set in step S306 or S307. This processing will be described later with reference to FIG. 4. When the camera control unit 207 has ended the AF control processing, processing proceeds to step S314.

In step S314, the camera control unit 207 displays, on the display unit 205, the AF frame or the later-described combined frame superimposed over image capturing signals.

In step S315, the camera control unit 207 executes the image capturing processing. The details will be described later with reference to FIG. 20. When the camera control unit 207 has ended the image capturing processing, processing returns to step S302, and the foregoing processing is repeated.

On the other hand, if the camera control unit 207 determines in step S303 that the focus control mode is MF manipulation, the camera control unit 207 executes processing for setting MF segment frames in step S309. The details of this processing will be described later with reference to FIGS. 12A to 12H. In step S310, the camera control unit 207 executes MF control processing. The details of this processing will be described later with reference to FIG. 17. In step S311, the camera control unit 207 calculates in-focus degrees of MF segment frames. This processing will be described later with reference to FIG. 18. In step S312, the camera control unit 207 executes processing for combining MF segment frames. This processing will be described later with reference to FIG. 19. In step S313, the camera control unit 207 stores position information of the frame that has been focused on by manipulating MF, as well as position information of the focus lens at that point, to a non-illustrated storage apparatus. At this time, information of the in-focus frame is stored in a manner identifiable by coordinates and a frame number. This information is used in executing step S304 again.

<Initialization Processing (Step S301)>

Figure 11:
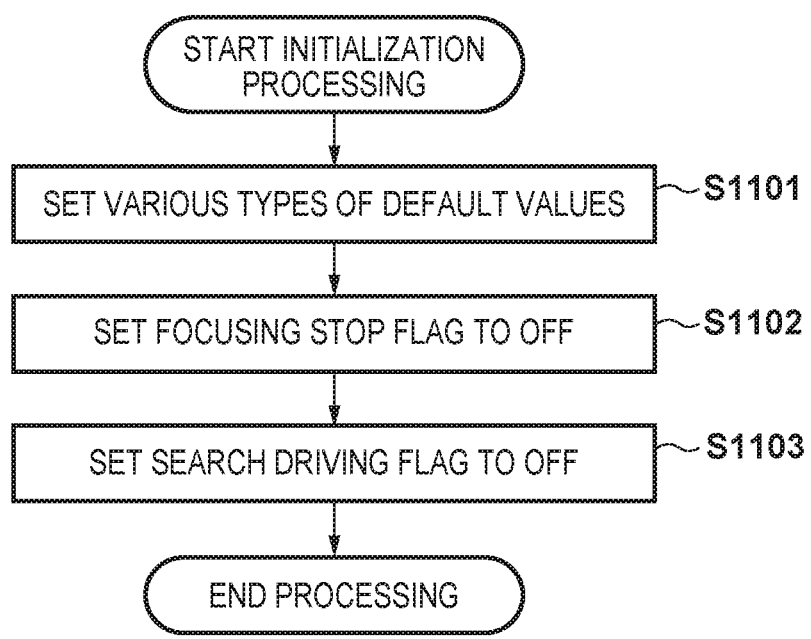
FIG. 11 is a flowchart showing a sequence of operations of initialization processing according to the present embodiment.

A description is now given of a sequence of operations of the initialization processing in step S301 with reference to FIG. 11. The initialization processing initializes, for example, predetermined variables, flags related to a driving state and a driving method of the focus lens, and the like when the image capturing processing has started or the image capturing mode has been changed.

In step S1101, the camera control unit 207 sets various types of default values of the camera. Upon receiving an instruction for starting the image capturing processing or changing the image capturing mode via the camera manipulation unit 208, various types of default values are set based on such information as user settings and the image capturing mode at that point.

In step S1102, the camera control unit 207 sets a focusing stop flag to OFF. The focusing stop flag is set to be ON when the focus lens is currently in a driven state, and OFF when the focus lens is currently in a stopped state.

In step S1103, the camera control unit 207 sets a search driving flag to OFF, and then ends the initialization processing. In search driving, a subject is searched for by, for example, driving the lens in a certain direction without using a defocus amount. The search driving flag is set to OFF and ON when a defocus amount detected with the imaging surface phase-difference detection method is reliable and unreliable, respectively, during lens driving. The defocus amount is reliable when the precision of the defocus amount is credible, or when a defocus direction is credible (that is to say, reliability is higher than a certain degree). For example, the defocus amount is reliable when the vicinity of a focus point with respect to a main subject is focused on, or when the main subject is already focused on. In this case, the defocus amount is relied upon, and driving is performed accordingly. The defocus amount is not reliable when the defocus amount and the defocus direction are not credible (that is to say, reliability is lower than the certain degree). For example, the defocus amount is not reliable when the subject is significantly out of focus and the defocus amount cannot be calculated accurately. In this case, the defocus amount is not relied upon, and search driving is performed accordingly.

<AF Frame Selection Processing (Step S304)>

Figure 15:
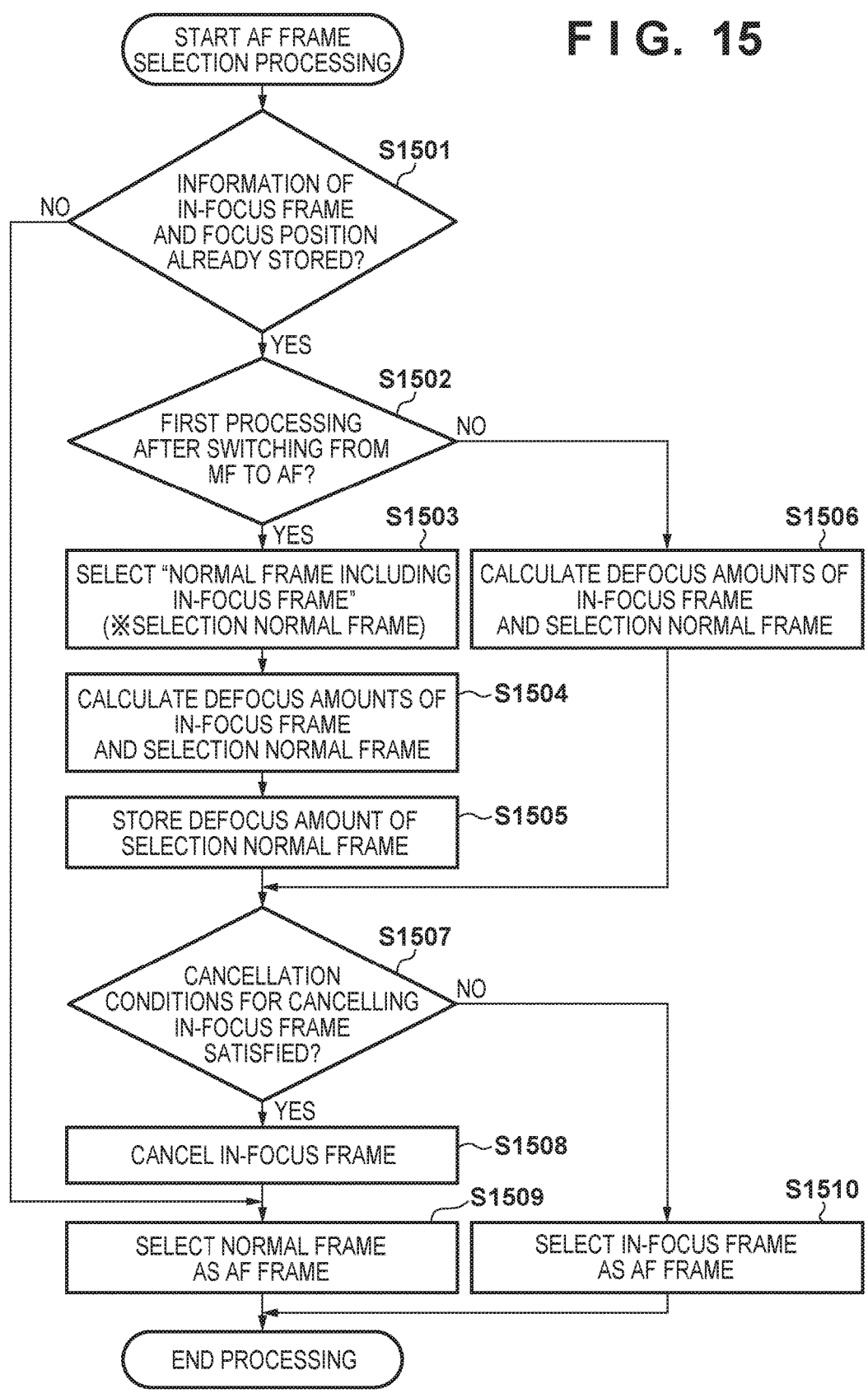
FIG. 15 is a flowchart showing a sequence of operations of AF frame selection processing according to the present embodiment.

A description is now given of a sequence of operations of the AF frame selection processing in step S304 with reference to FIG. 15. FIG. 15 is a flowchart showing the AF frame selection processing. In the AF frame selection processing, upon switching from MF to AF, whether to select a frame that was determined to be in focus during MF (in-focus frame) as an AF area is determined. Specifically, if predetermined conditions are satisfied, e.g., if the subject has moved significantly, the in-focus frame is cancelled and a normal frame covering a larger area is set as the AF area. Here, the camera control unit 207 functions as a setting unit.

In step S1501, the camera control unit 207 determines whether in-focus frame information and focus lens position information were stored in step S313; processing proceeds to step S1502 if they were stored, and processing proceeds to step S1509 if they were not stored.

In step S1502, the camera control unit 207 determines whether the present processing is being executed for the first time or the second time onward after switching from MF to AF. Processing proceeds to step S1503 if it is determined that the present processing is being executed for the first time, and processing proceeds to step S1506 if it is determined that the present processing is being executed for the second time onward.

In step S1503, the camera control unit 207 selects a normal frame including the in-focus frame based on the in-focus frame information stored in step S313, and then processing proceeds to step S1504. Hereinafter, in the present embodiment, the "normal frame including the in-focus frame" is referred to as a "selection normal frame."

In step S1504, the camera control unit 207 performs focus detection in the in-focus frame and the selection normal frame, and calculates defocus amounts.

In step S1505, the camera control unit 207 stores the defocus amount of the selection normal frame calculated in step S1504 to a non-illustrated storage apparatus. In step S1506, the defocus amounts of the in-focus frame and the selection normal frame are calculated, similarly to processing in step S1504.

Note that the defocus amount of the selection normal frame cannot be stored in step S1505 if the defocus amount of the selection normal frame is not output or the output defocus amount has low reliability. In this case, it is permissible to store the defocus amount calculated in step S1506 in the present processing performed for the second time onward after switching to AF.

In step S1507, based on the defocus amounts of the in-focus frame and the selection normal frame calculated in step S1506 and on an image capturing condition, the camera control unit 207 determines whether cancellation conditions for cancelling the in-focus frame are satisfied.

The following three conditions are specific examples of the cancellation conditions. Regarding the first cancellation condition, the camera control unit 207 calculates the difference between the focus lens position stored in step S313 and the current focus lens position (that is to say, the focus lens positions before and after switching from MF to AF), and determines whether the difference is larger than or equal to a predetermined value. Here, the "current focus lens position" may be replaced by a "lens position based on a combination of the current focus lens position and the amount of lens movement corresponding to the calculated defocus amount." That is to say, a determination is made about whether the difference between the focus lens position stored before switching to AF and the focus lens position after switching to AF is larger than or equal to the predetermined value. The in-focus frame is cancelled if the difference is larger than or equal to the predetermined value, and the in-focus frame is not cancelled if the difference is smaller than the predetermined value. This is because, while a subject area intended by the user is brought into focus by focusing on a segment frame obtained while manipulating MF, a significant movement of the intended subject may cause the intended subject to deviate from the segment frame, which gives rise to the possibility that AF cannot be performed appropriately. In view of this, if the difference between the current lens position based on the result of AF with respect to the in-focus frame and the lens position while manipulating MF is larger than or equal to a threshold, the camera control unit 207 determines that the subject has moved significantly, and cancels the in-focus frame. The threshold is set to be approximately ±2-3 Fδ so as to track slight shaking of the subject to be captured, and cancel the in-focus frame in the event of a significant movement. The threshold can be changed by a system as appropriate. The threshold may be changed in accordance with the number of combined segment frames, or may be changed in accordance with a camera setting.

Regarding the second cancellation condition, the difference between the defocus amount of the selection normal frame stored in step S1505 and the current defocus amount of the selection normal frame is calculated, and whether the difference is larger than or equal to a predetermined value is determined. The in-focus frame is cancelled if the difference is larger than or equal to the predetermined value, and the in-focus frame is not cancelled if the difference is smaller than or equal to the predetermined value. This is because, when the defocus amount of the selection normal frame has significantly changed since immediately after switching from MF to AF, there is a possibility that the subject in the in-focus frame within the selection normal frame has also significantly moved. When the defocus amount of the in-focus frame does not satisfy the first cancellation condition despite a significant change in the defocus amount of the selection normal frame, there is a possibility of error in detection of the defocus amount of the in-focus frame. However, in a scene where the subject is small and the background changes significantly, there is a possibility that "the first cancellation condition is not satisfied but the second cancellation condition is satisfied," and hence the second cancellation condition may be used to change the threshold for the first cancellation condition. A threshold for the second cancellation condition is set to have a larger value than the threshold for the first cancellation condition.

Regarding the third cancellation condition, a determination is made about whether the image capturing condition has changed to the extent that panning, zoom manipulation, and brightness change. For example, it is determined that the image capturing condition has changed when panning has been detected based on the amount of camera movement and the like, when the zoom lens has moved (the focal length has changed), when brightness has changed by a predetermined value or more, etc. The in-focus frame is cancelled if the image capturing condition has changed, and the in-focus frame is not cancelled if the image capturing condition has not changed.

By making a determination about the aforementioned cancellation conditions, the camera control unit 207 can maintain a subject intended by the user or a part of the subject in focus, and enables appropriate AF operations when the subject and the image capturing condition have changed.

In step S1508, the camera control unit 207 cancels the in-focus frame. Specifically, it deletes information of the in-focus frame (the coordinates and the frame number).

In step S1509, upon determining that the information of the in-focus frame has been deleted, the camera control unit 207 selects the normal frame as the AF frame, and then end the processing sequence for selecting the AF frame.

In step S1510, the information of the in-focus frame is checked and the in-focus frame is selected as the AF frame, and then the processing sequence for selecting the AF frame is ended.

Figure 21A:
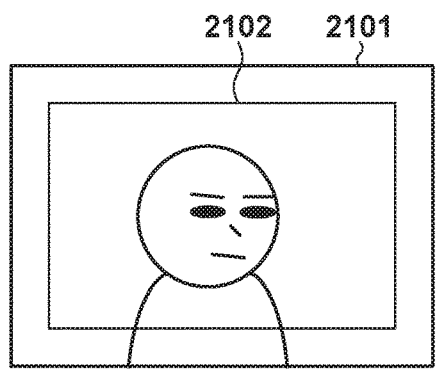
FIGS. 21A to 21C specifically illustrate the AF frame selection processing according to the present embodiment.

A specific example of the aforementioned AF frame selection processing will now be described with reference to FIGS. 21A to 21C. First, a description is given of an exemplary case where there is one AF frame at the center with reference to FIGS. 21A and 21C. FIG. 21A shows an angle of view 2101 and an AF frame 2102 (one AF frame at the center). The AF frame 2102 may be displayed or may not be displayed on a display apparatus, such as the display unit 205.

Upon switching to an MF mode or when MF is manipulated in the state of FIG. 21A, focus detection frames shown in FIG. 21C, which are obtained through segmentalization in the later-described processing for setting MF segment frames (step S309), are set. Thereafter, if MF is manipulated in the state of FIG. 21C, a frame in an in-focused state (i.e., an in-focus frame) is detected from among the focus detection frames obtained through segmentalization in processing from step S309 to step S313 shown in FIG. 3, and information of the detected frame is stored to the storage apparatus.

Upon switching from MF to AF in this state, a selection normal frame is selected in step S1503. In FIG. 21A, the selection normal frame corresponds to 2102. From then on, processing from step S1506 to step S1510 is executed with 2103 set as the in-focus frame, and the position of the frame 2102 set as the selection normal frame.

Figure 21B:
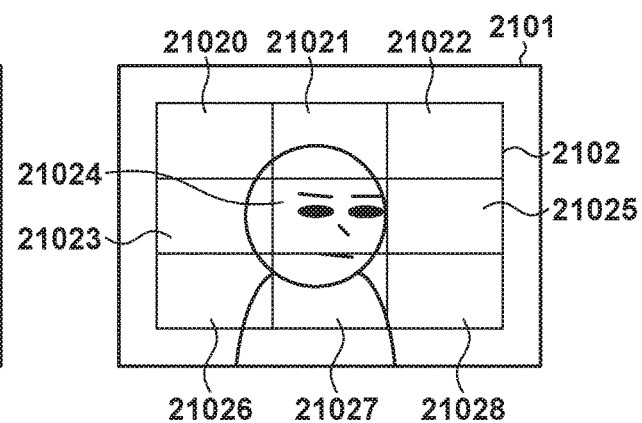
Figure 21C:
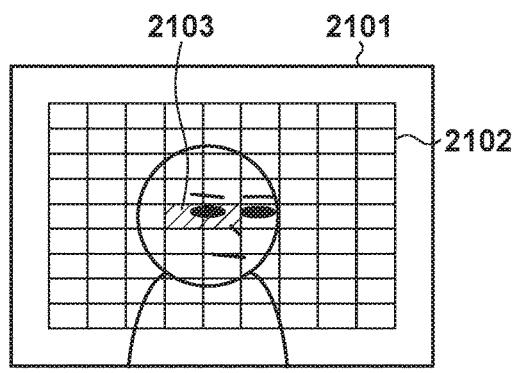

Next, a description is given of an exemplary case where there are three-by-three, i.e., nine areas serving as AF frames during AF with reference to FIGS. 21B and 21C. FIG. 21B shows nine AF frames 21020 to 21028 during AF. Upon switching from MF in the state of FIG. 21C to AF, a selection normal frame is selected in step S1503. In the example of FIG. 21B, the selection normal frame corresponds to 21024. From then on, processing from step S1506 to step S1510 is executed with 2103 set as the in-focus frame, and 21024 set as the selection normal frame.

When the in-focus frame overlaps two or more frames included among the three-by-three frames, AF frames including the in-focus frame are set as the selection normal frame. When the selection normal frame is set using a method other than the above-described method, a predetermined area centered at the in-focus frame may be set as the selection normal frame instead of selecting one of the AF frames at fixed positions during AF.

<Normal Frame Setting Processing (Step S306)>

The normal frame setting processing in step S306 will now be described with reference to FIGS. 12A to 12H, 16A, and 16B.

Figure 12A:
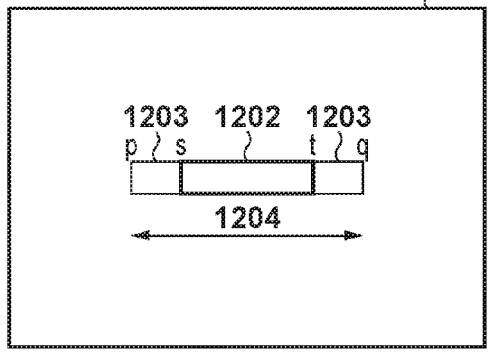
FIGS. 12A to 12H show focus detection areas according to the present embodiment.

FIGS. 12A to 12H show examples of an area from which image signals handled in focus detection processing are obtained (focus detection range). During AF, a focus detection range is equivalent to the range of an AF frame. Focus detection is performed based on image signals output from an area corresponding to the focus detection range within an area of the image sensor 201. FIG. 12A shows a focus detection range 1202 in an image signal 1201. An area 1204 necessary for carrying out correlation computation is obtained by adding the focus detection range 1202 and shift areas 1203 necessary for correlation computation. In FIG. 12A, p, q, s, and t denote coordinates in the x-axis direction. Here, the area 1204 extends from p to q, and the focus detection range 1202 extends from s to t.

Figure 12B:
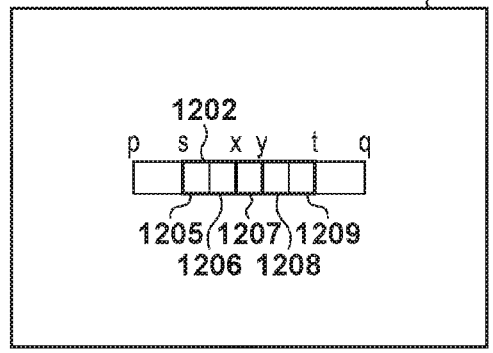

FIG. 12B shows focus detection areas 1205 to 1209 obtained by dividing the focus detection range 1202 into five areas. In the present embodiment, out-of-focus amounts are calculated in one-to-one correspondence with the focus detection areas to perform focus detection by way of example. The present embodiment selects a computation result in the most reliable area among the plurality of focus detection areas obtained through the division, and uses the out-of-focus amount calculated in the most reliable area for AF and an in-focus determination. Note that the focus detection range is not limited to being divided into the aforementioned number of areas.

Figure 12C:
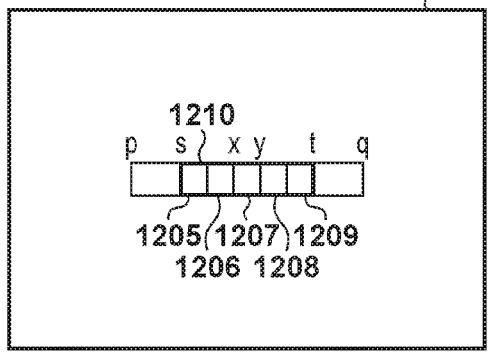

FIG. 12C shows a tentative focus detection area 1210 obtained by merging the focus detection areas 1205 to 1209 shown in FIG. 12B. In an example of the embodiment, an out-of-focus amount calculated from such an area obtained by merging the focus detection areas may be used for AF.

Figure 12D:
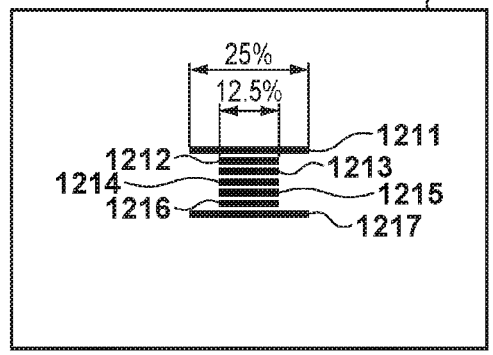

When a restriction is placed on focus detection areas, or when a plurality of focus detection areas cannot be arranged on a screen due to a restriction on a time period of focus detection processing and the like, it is permissible to use a method whereby one focus detection area is composed of a plurality of areas having different lengths as shown in FIG. 12D, for example. FIG. 12D shows an exemplary arrangement of focus detection areas, specifically, seven focus detection areas 1211 to 1217. In this figure, the following areas are arranged at the center of an image capturing screen: two areas (1211, 1217), a ratio of which to the image capturing screen in the horizontal direction is 25%, and five areas (1212 to 1216); a ratio of which to the image capturing screen in the horizontal direction is 12.5%. In this way, a plurality of focus detection areas having different sizes are arranged in such a manner that the number of areas having a ratio of 12.5% to the image capturing screen is larger than the number of areas having a ratio of 25% to the image capturing screen. Then, one effective defocus amount and one effective defocus direction are calculated by combining the computation results obtained from the seven focus detection areas 1211 to 1217. An in-focus state is achieved by driving the focus lens 103 using this effective defocus amount or effective defocus direction.

As such, in the example of FIG. 12D, a subject at the center of the image capturing screen can be brought into better focus by arranging many focus detection areas having a small ratio to the image capturing screen. Furthermore, the influence exerted by subjects of different distances on AF is alleviated by reducing the ratio of the focus detection areas to the image capturing screen. Moreover, by arranging not only focus detection areas having a small ratio to the image capturing screen but also focus detection areas having a large ratio to the image capturing screen, unstable focusing caused by deviation of a subject from a focus detection area is alleviated. That is to say, even if the subject has temporarily deviated from a focus detection area, the subject can be maintained in focus as long as the subject is covered by the focus detection areas having a large ratio to the image capturing screen.

Figure 12E:
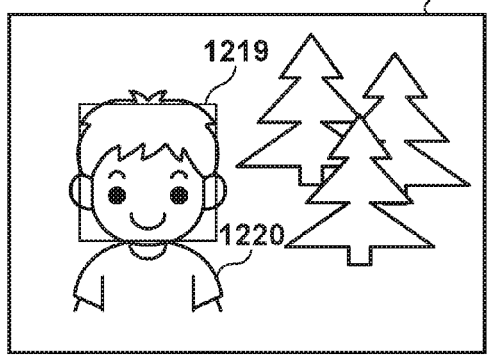

When a face detection function is effective, an AF frame 1219 can be set at the position of a detected face 1220 as shown in FIG. 12E. In this case, one or more of the frames shown in FIGS. 12A to 12D are set with respect to the detected face frame, and one effective defocus amount and one effective defocus direction are calculated by combining the computation results obtained from the focus detection areas. Then, an in-focus state is achieved by driving the focus lens 103 using this effective defocus amount or effective defocus direction.

Figure 12F:
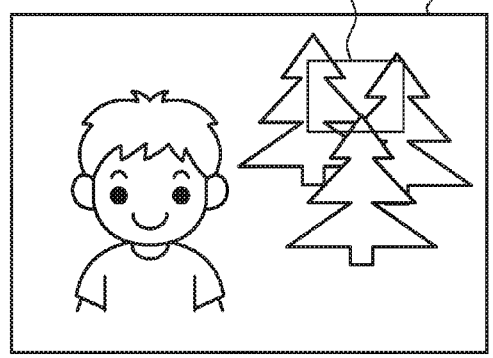

In the case of a camera with a touch AF function or the like, the position of an AF frame may be freely designated by the user. The AF frame can be set at a designated position 1221 as shown in FIG. 12F. Note that the arrangement, the size, and the like of the focus detection areas are not limited to those described in the present embodiment as long as they do not depart from the principles of the invention.

Figure 16A:
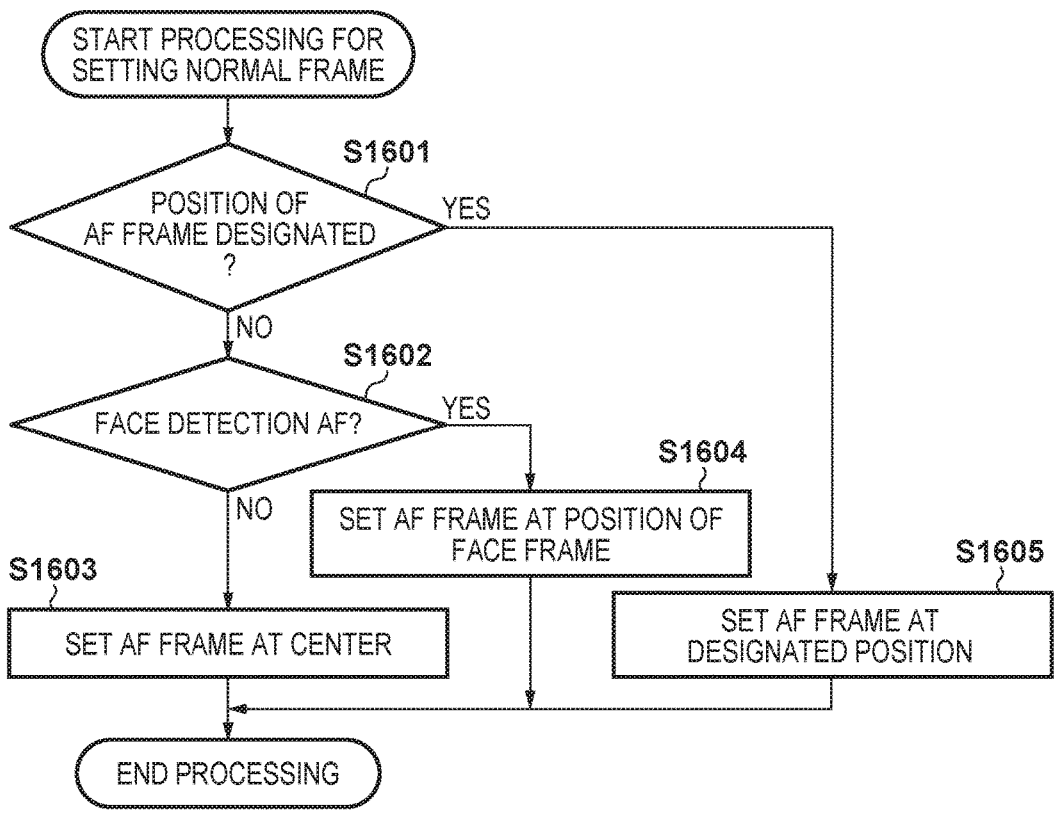
FIG. 16A is a flowchart showing a sequence of operations of normal frame setting processing according to the present embodiment.

With reference to FIG. 16A, a description is now given of processing for setting an AF frame (here, a normal frame) exemplarily shown in FIGS. 12A to 12F. FIG. 16A is a flowchart showing processing for setting a normal frame.

In step S1601, the camera control unit 207 determines whether the position of an AF frame has been designated; if the position has been designated, processing proceeds to step S1605, and if not, processing proceeds to step S1602. Note that the AF frame can be designated by, for example, touching a touchscreen of the camera manipulation unit 208, and manipulating arrow keys of the camera manipulation unit 208.

In step S1602, the camera control unit 207 determines whether face detection AF is being performed. If face detection is being performed, processing proceeds to step S1604, and if not, processing proceeds to step S1603. It will be assumed that face detection is performed using a known detection method in the present embodiment, and the details of a face detection method will be omitted.

In step S1603, the camera control unit 207 sets the AF frame at the center of a screen, and then ends the processing sequence for setting the normal frame. The camera control unit 207 sets the AF frame with respect to a face area as shown in FIG. 12E in step S1604, or sets the AF frame at the designated position as shown in FIG. 12F in step S1605, and then ends the processing sequence for setting the normal frame.

<In-Focus Frame Setting Processing (Step S307)>

Figure 16B:
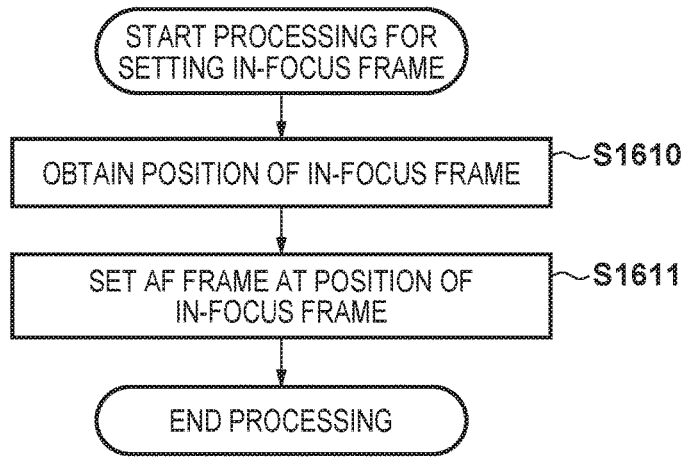
FIG. 16B is a flowchart showing a sequence of operations of in-focus frame setting processing according to the present embodiment.

With reference to FIG. 16B, a description is now given of in-focus frame setting processing in step S307, that is to say, processing for setting the AF frame at the in-focus frame. FIG. 16B is a flowchart showing the in-focus frame setting processing.

In step S1610, the camera control unit 207 obtains the position of the in-focus frame. This is processing for calling up the information of the in-focus frame stored in step S313. The in-focus frame may be designated using any method, e.g., by designating coordinates, by designating a frame number, etc. In step S1611, the camera control unit 207 sets the AF frame based on the information of the in-focus frame obtained in step S1610. The foregoing processing enables the AF frame to be set at the position of a frame that has been brought into focus by manipulating MF.

<Processing for Setting MF Segment Frames (Step S309)>

In order to provide an ordered description of processing during MF (from step S309 to step S313), the processing for setting MF segment frames in step S309 will be described first with reference to FIGS. 12G and 12H.

Figure 12G:
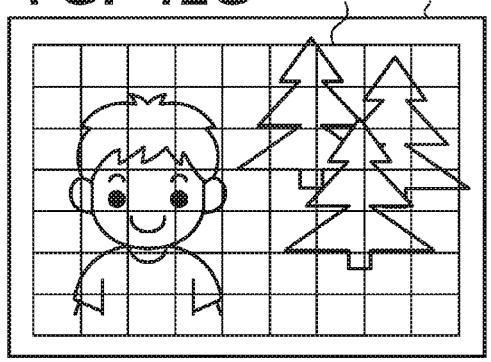
Figure 12H:
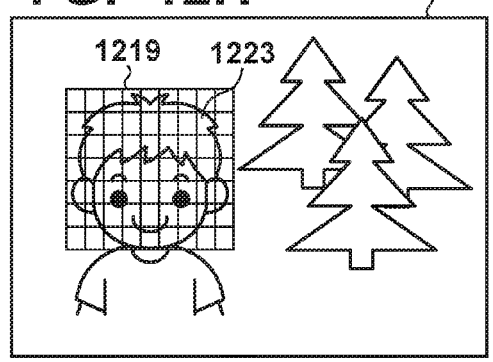

FIGS. 12G and 12H show examples of a focus detection range while manipulating MF. In the present embodiment, upon switching from AF to MF, the camera control unit 207 sets segment frames having a higher level of segmentation than a normal AF frame set during AF (that is to say, small focus detection areas). For example, these segment frames may be arranged as segment frames 1222 across the entire screen as shown in FIG. 12G, or may be arranged as segment frames 1223 obtained by segmentalizing an AF frame 1219 set during AF as shown in FIG. 12H.

<MF Control Processing (Step S310)>

Figure 17:
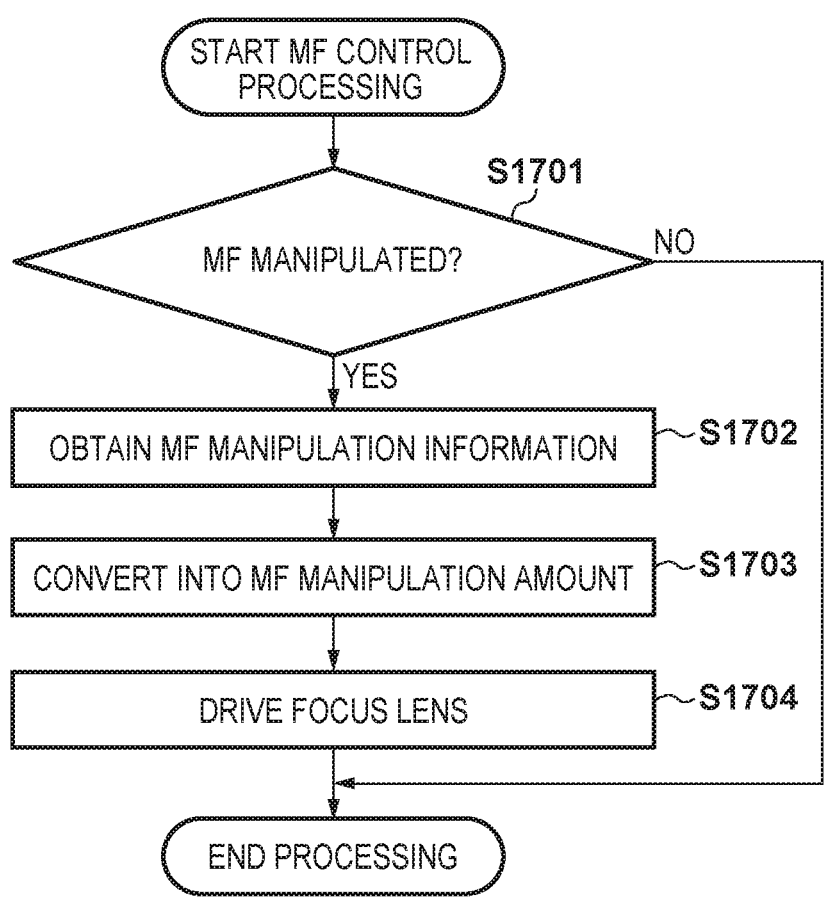
FIG. 17 is a flowchart showing a sequence of operations of MF control processing according to the present embodiment.

With reference to FIG. 17, a description is now given of the MF control processing in step S310, that is to say, a sequence of operations of control processing for the focus lens 103 and the like based on MF manipulated by the user. FIG. 17 is a flowchart showing the MF control processing.

In step S1701, the camera control unit 207 determines whether MF has been manipulated. If MF has been manipulated, processing proceeds to step S1702, and if not, the MF control processing is ended.

In step S1702, the camera control unit 207 obtains MF manipulation information via the camera manipulation unit 208 to specify a driving direction and a driving amount of the focus lens. In step S1703, the camera control unit 207 converts the obtained MF manipulation information into the driving amount of the focus lens. In step S1704, the camera control unit 207 transmits a driving command including the driving amount of the focus lens. The driving command for the focus lens is transmitted to the focus lens driving unit 105, and the focus lens 103 is driven accordingly. Then, the camera control unit 207 ends the MF control processing sequence.

<Processing for Calculating MF In-Focus Degrees (Step S311)>

Figure 18:
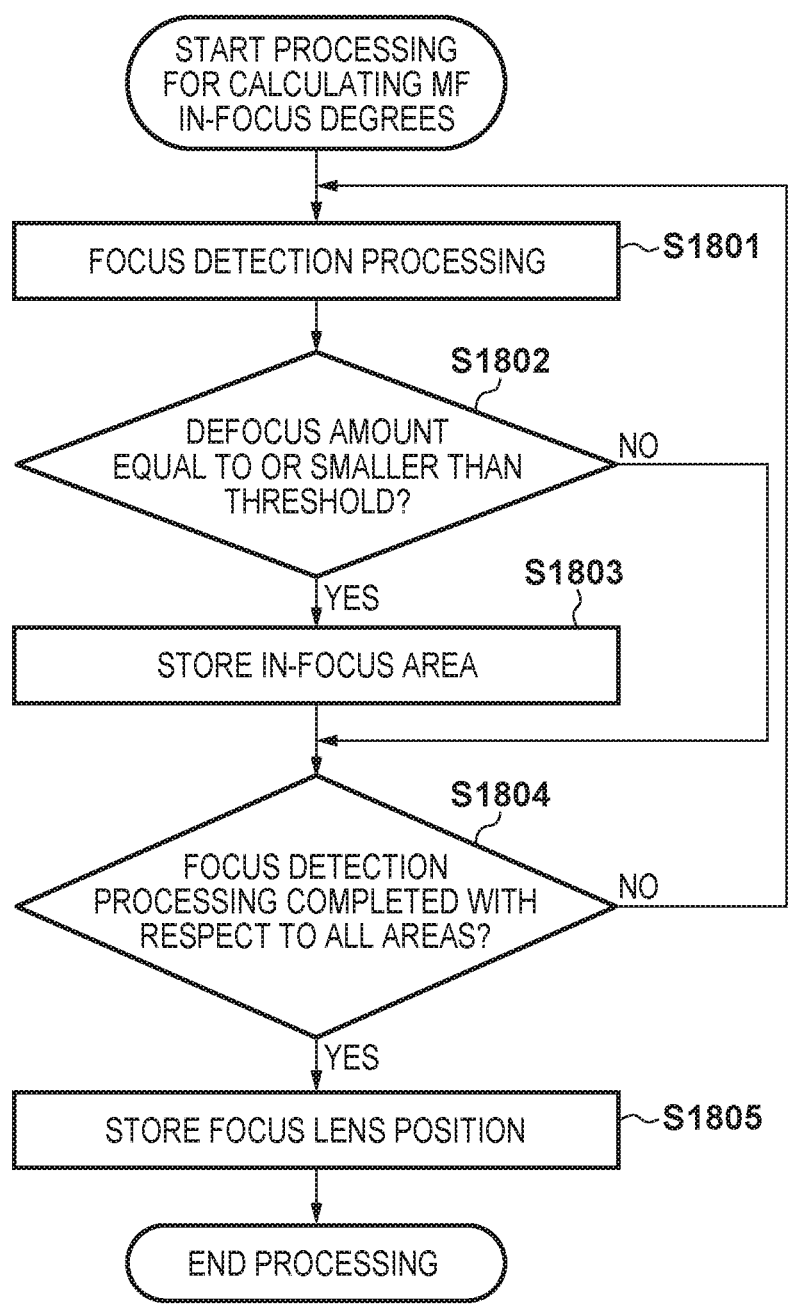
FIG. 18 is a flowchart showing a sequence of operations of processing for calculating MF in-focus degrees according to the present embodiment.

With reference to FIG. 18, a description is now given of processing for calculating MF in-focus degrees in step S311, that is to say, processing for calculating in-focus degrees in one-to-one correspondence with focus detection frames obtained through segmentalization for MF. FIG. 18 is a flowchart showing the processing for calculating the MF in-focus degrees.

In step S1801, the camera control unit 207 performs focus detection processing. The details of the focus detection processing will be described later with reference to FIG. 5. In step S1802, the camera control unit 207 determines an in-focus degree by determining whether a defocus amount calculated in step S1801 is smaller than or equal to a predetermined value. If the defocus amount is smaller than or equal to a predetermined threshold, processing proceeds to step S1803, and if not, processing proceeds to step S1804. In step S1803, the camera control unit 207 stores information of an in-focus area to, for example, a non-illustrated storage apparatus. As mentioned earlier, the information of the in-focus area may be stored by storing coordinates of a frame whose defocus amount has been determined to be smaller than or equal to the threshold, or by storing a frame number.

In step S1804, the camera control unit 207 determines whether focus detection and calculation of an in-focus degree have been completed with respect to all areas (that is to say, all segment frames). If the focus detection and calculation have been completed, processing proceeds to step S1805, and if not, processing returns to step S1801 and continues until the focus detection and calculation are completed with respect to all areas.

In step S1805, the camera control unit 207 stores a focus lens position that has been decided on by a user's manipulation to a non-illustrated storage apparatus, and then ends the processing sequence for calculating the in-focus degrees. Although the MF focus detection processing (step S1801) is executed by the camera control unit 207 in the description of the present embodiment, it may be executed by the focus detection signal processing unit 204 instead.

<Processing for Combining MF Frames>

Figure 19:
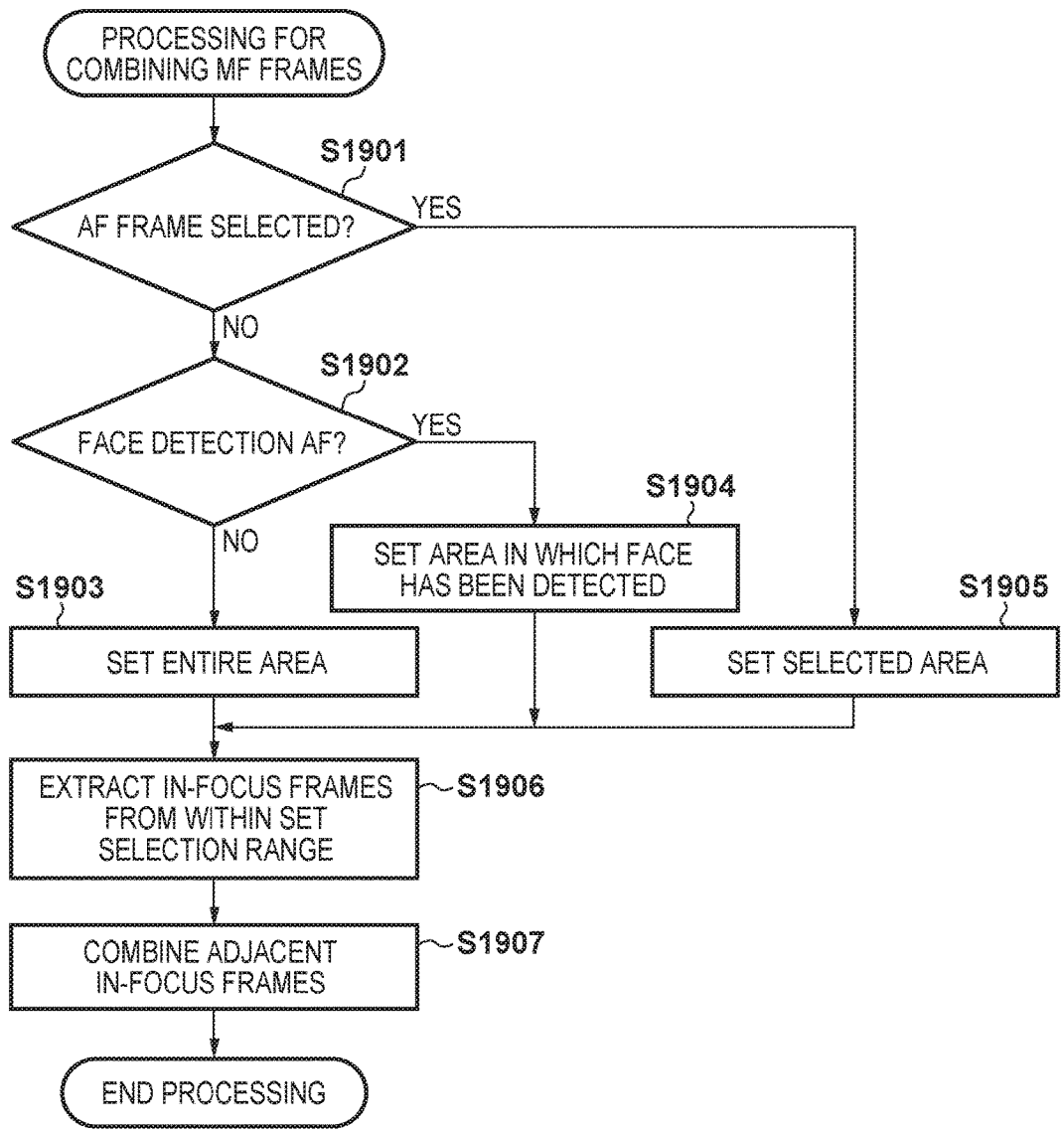
FIG. 19 is a flowchart showing a sequence of operations of processing for combining MF frames according to the present embodiment.

With reference to FIG. 19, a description is now given of processing for combining MF segment frames in step S312 shown in FIG. 3. FIG. 19 is a flowchart showing the processing for combining MF frames.

In step S1901, the camera control unit 207 determines whether an AF frame was selected by the user during AF. If the AF frame was selected, processing proceeds to step S1905, and if not, processing proceeds to step S1902. A detailed description of a method of selecting the AF frame will be omitted as a known method can be used thereas; for example, the user selects the AF frame by manipulating the touchscreen and the arrow keys of the camera manipulation unit 208.

In step S1902, the camera control unit 207 determines whether face detection AF is being performed. If face detection is being performed, processing proceeds to step S1904, and if not, processing proceeds to step S1903. In the present embodiment, face detection is performed using a known method, as in step S1602 described earlier, and hence the details of a face detection method will be omitted.

In steps S1903 to S1905, the camera control unit 207 sets in-focus frames as a selection range. In step S1903, the entire area of an AF frame is set as the selection range, whereas in step S1904, an area in which a face has been detected is set as the selection range. In step S1905, the selected AF frame is set as the selection range.

In step S1906, in-focus frames within the set selection range are extracted. Here, based on the information of the in-focus area stored in step S1803, segment frames whose defocus amounts have been determined to be smaller than or equal to the threshold are extracted as the in-focus frames. In step S1907, among the extracted in-focus frames, in-focus frames having adjacent coordinates are combined into one frame (also referred to a combined frame), and then the processing sequence for combining MF frames is ended.

Figure 22A:
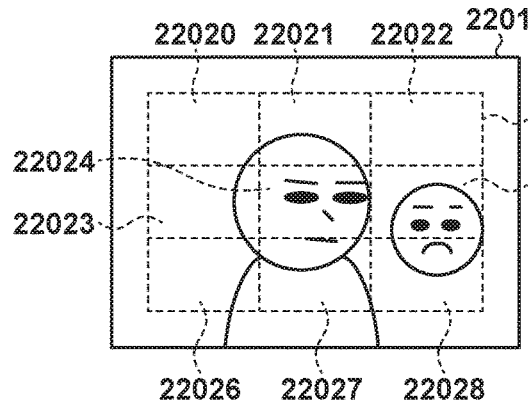
FIGS. 22A to 22F specifically illustrate display of focus detection frames according to the present embodiment.

With reference to FIGS. 22A to 22F, a description is now given of a specific example of the aforementioned processing sequences during MF (that is to say, from the processing for setting the MF segment frames to the processing for combining MF frames). FIG. 22A shows subjects and AF frames during AF. An AF area 2202 is provided with respect to an angle of view 2201, and this AF frame 2202 is divided into, for example nine AF frames 22020 to 22028.

Figure 22B:
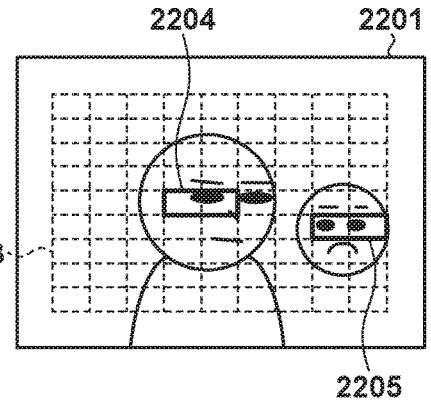

In the state of FIG. 22A, if it is determined that there has been a switchover from AF to MF or that MF has been manipulated, the processing for setting the MF segment frames (step S309) is executed, and focus detection frames 2203 are set through segmentalization, as shown in FIG. 22B.

Then, if MF control (step S310) is performed in the state of FIG. 22B where the focus detection frames have been set through segmentalization, the processing for calculating the MF in-focus degrees (step S311) is executed, and hence an in-focus degree (defocus amount) of each focus detection frame is calculated. In accordance with the calculation result, in-focus areas are set as in-focus frames. Furthermore, in the processing for combining MF frames (step S312), in-focus frames having adjacent coordinates are reconstructed as one combined frame, e.g., a combined frame 2204 and a combined frame 2205. The reconstructed combined frames 2204 and 2205 are displayed on the display unit 205 in the display processing (step S314).

Figure 22C:
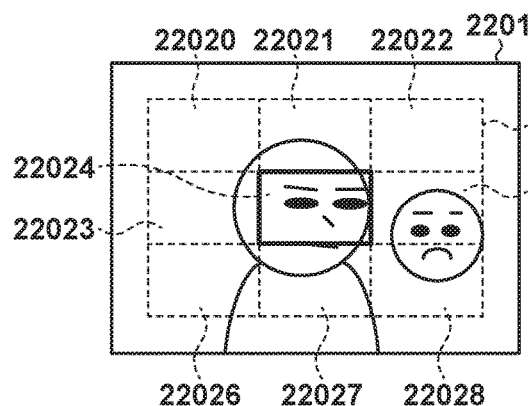
Figure 22D:
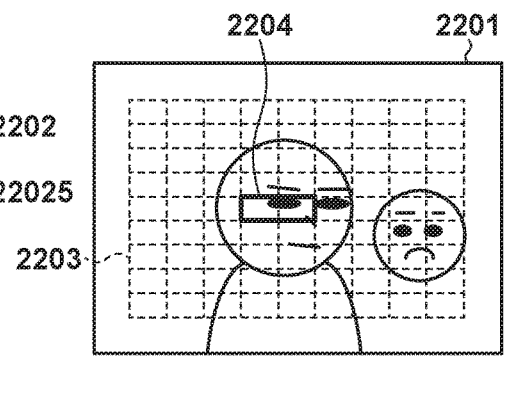

Meanwhile, FIG. 22C shows a state where an AF frame 22024 is selected by the user during AF. If there is a switchover to the MF mode or MF is manipulated in this state of FIG. 22C, the processing for setting the MF segment frames (step S309) is executed, and hence focus detection frames 2203 are set through segmentalization, as shown in FIG. 22D. If MF is further manipulated in the state of FIG. 22D, in-focus areas calculated in the processing for calculating the MF in-focus degrees (step S311) are set as in-focus frames. In this case, in-focus frames calculated within the range of the selected AF frame 22024 are extracted. Furthermore, in-focus frames having adjacent coordinates are combined and reconstructed as a combined frame 2204 in step S1907. Thereafter, the combined frame 2204 is displayed on the display unit 205 in the display processing (step S314).

Although an AF frame is selected by a user's manipulation in the above-described example, a face detection function may be used as will be described below with reference to FIGS. 22E and 22F.

Figure 22E:
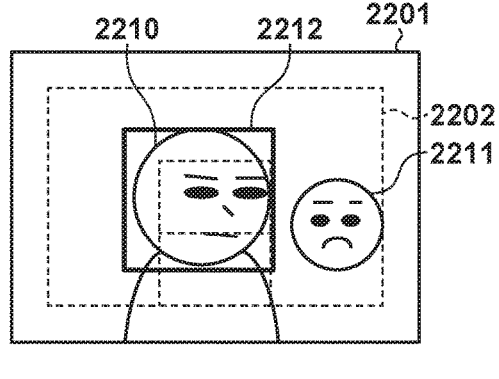

In the example of FIG. 22E, face areas of subjects 2210 and 2211 are detected from an image. In FIG. 22E, among the faces of the subjects, the face of the subject 2210 is differentiated as a main face, and a face frame 2212 is set in accordance with the area of the detected main face. During AF, the range of this face frame serves as an AF frame. One example of methods of selecting a main face is to allocate the highest priority level to a face that has been selected by an instruction issued by a photographer, and allocate subsequent priority levels in such a manner that a higher priority level is allocated to a face that is located closer to the center of the screen has a larger size. Note that the priority levels may be allocated to faces using other methods.

Figure 22F:
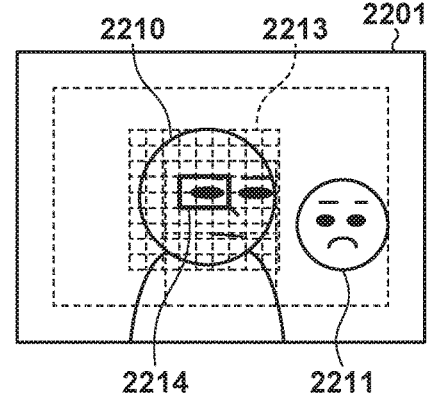

If there is a switchover to the MF mode or MF is manipulated in the state of FIG. 22E where the AF frame has been set at the face frame 2212, the processing for setting the MF frames (step S309) is executed, and hence focus detection frames 2213 are set within the range of the set face frame 2212 through segmentalization, as shown in FIG. 22F. Furthermore, if MF is manipulated in the state of FIG. 22F, in-focus areas calculated in the processing for calculating the MF in-focus degrees (step S311) are set as in-focus frames. In-focus frames having adjacent coordinates are combined and reconstructed as a combined frame 2214 in step S1907. Thereafter, the combined frame 2214 is displayed on the display unit 205 in the display processing (step S314).

When face detection has low reliability, e.g., when a target face cannot be detected, the entire focus detection areas may be set as a selection range for an in-focus frame.

<Image Capturing Processing (Step S315)>

Figure 20:
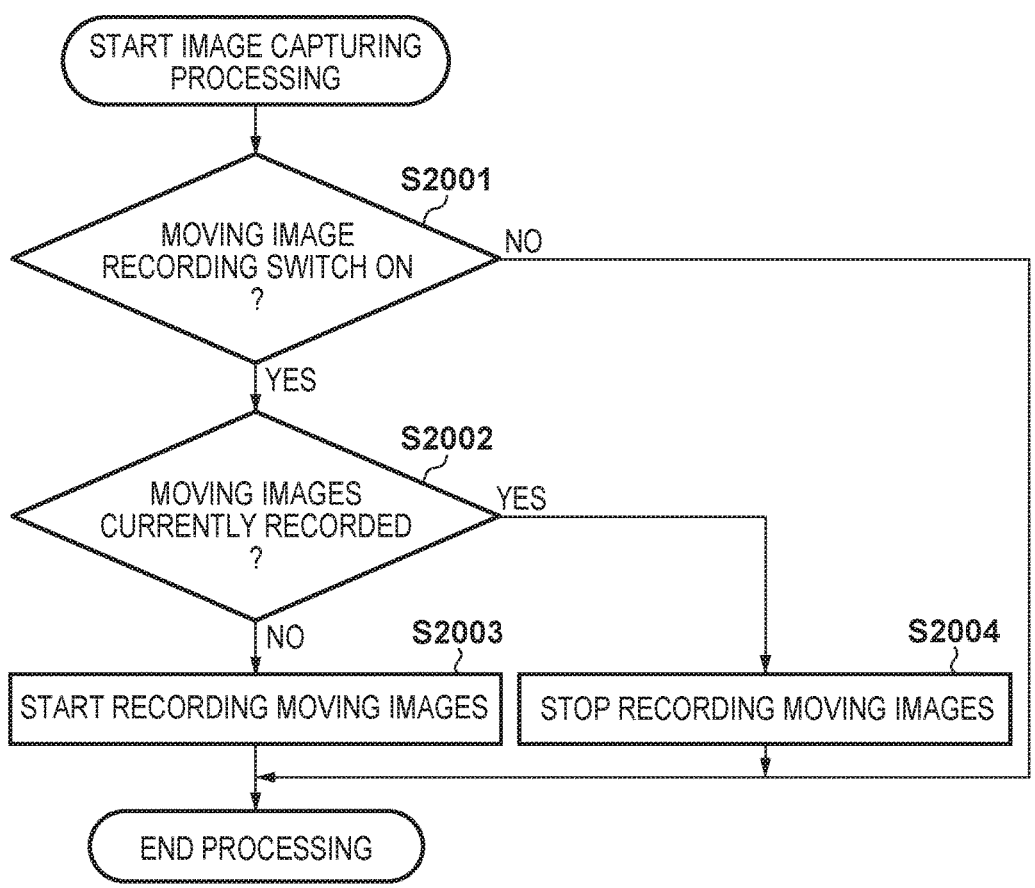
FIG. 20 is a flowchart showing a sequence of operations of image capturing processing according to the present embodiment.

A description is now given of the image capturing processing in step S315 with reference to FIG. 20. FIG. 20 is a flowchart showing the image capturing processing (here, moving image capturing processing). In step S2001, the camera control unit 207 determines whether a moving image recording switch is ON; if the moving image recording switch is ON, processing proceeds to step S2002, and if the moving image recording switch is not ON, processing proceeds to step S2305.

In step S2002, the camera control unit 207 determines whether moving images are currently recorded. If moving images are not currently recorded, processing proceeds to step S2003, recording of moving images is started, and the sequence of operations of the image capturing processing is ended. On the other hand, if moving images are currently recorded, processing proceeds to step S2004, recording of moving images is stopped, and the image capturing processing sequence is ended. Although recording of moving images is started and stopped by pressing down the moving image recording switch in the present embodiment, recording may be started and stopped using other methods, e.g., using a changeover switch. Furthermore, although FIG. 20 only illustrates the case of recording of moving images, still images may be captured and recorded upon issuance of an instruction for capturing still images during live-view image capture.

<AF Control Processing (Step S308)>

Figure 4:
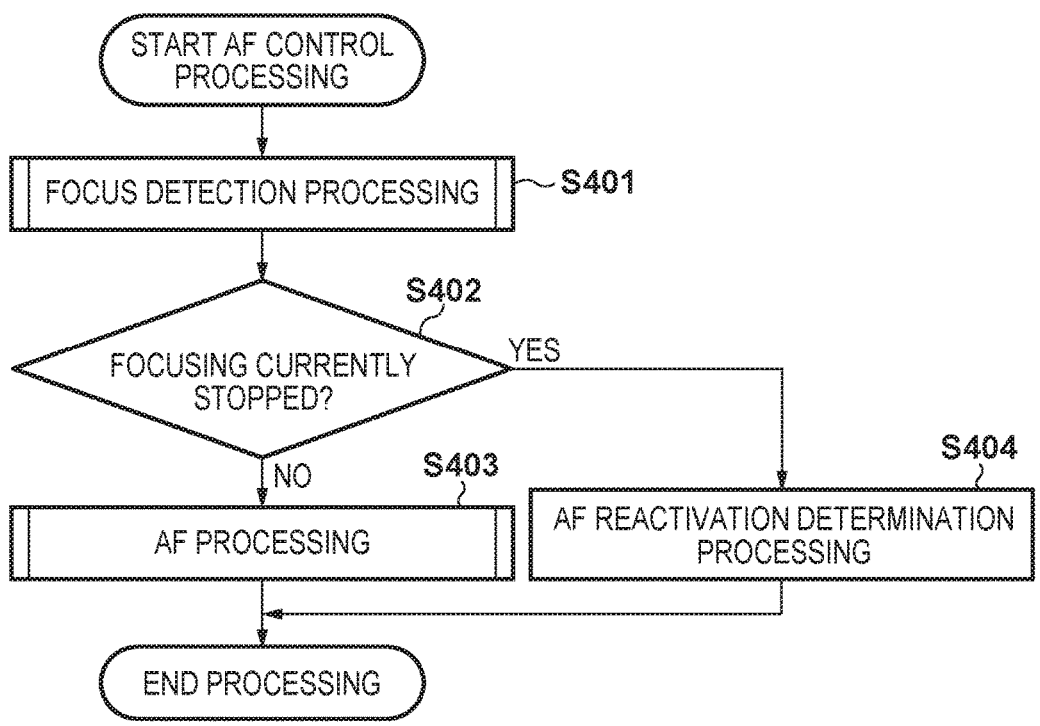
FIG. 4 is a flowchart showing a sequence of operations of AF control processing according to the present embodiment.

The AF control processing in step S308 will now be described with reference to FIG. 4. FIG. 4 is a flowchart showing the AF control processing.

In step S401, the camera control unit 207 causes the focus detection signal processing unit 204 to execute focus detection processing, and obtains defocus information and reliability information for performing focus detection according to the imaging surface phase-difference method. This processing is similar to processing in step S1801 shown in FIG. 18. The details of the focus detection processing will be described later with reference to FIG. 5.

In step S402, the camera control unit 207 determines whether focusing is currently stopped (that is to say, a main subject is in focus and the focus lens is in a stopped state); if focusing is not currently stopped, processing proceeds to step S403, if focusing is currently stopped, processing proceeds to step S404. More specifically, the camera control unit 207 determines whether focusing is currently stopped based on the ON/OFF state of the flag (focusing stop flag) for stopping driving of the focus lens while the main subject is in focus. Note that ON/OFF of the focusing stop flag is set in, for example, step S606 described later.

AF processing is executed in step S403, and then the AF control processing is ended. The AF processing is executed based on the defocus information and the reliability information obtained in step S401. The details will be described later with reference to FIG. 7.

An AF reactivation determination is made in step S404, and then the AF control processing is ended.

In step S404, a determination is made about whether to re-start AF control due to a change in a subject since focusing was stopped. The details will be described later with reference to FIG. 6.

<Focus Detection Processing (Step S401)>

Figure 5:
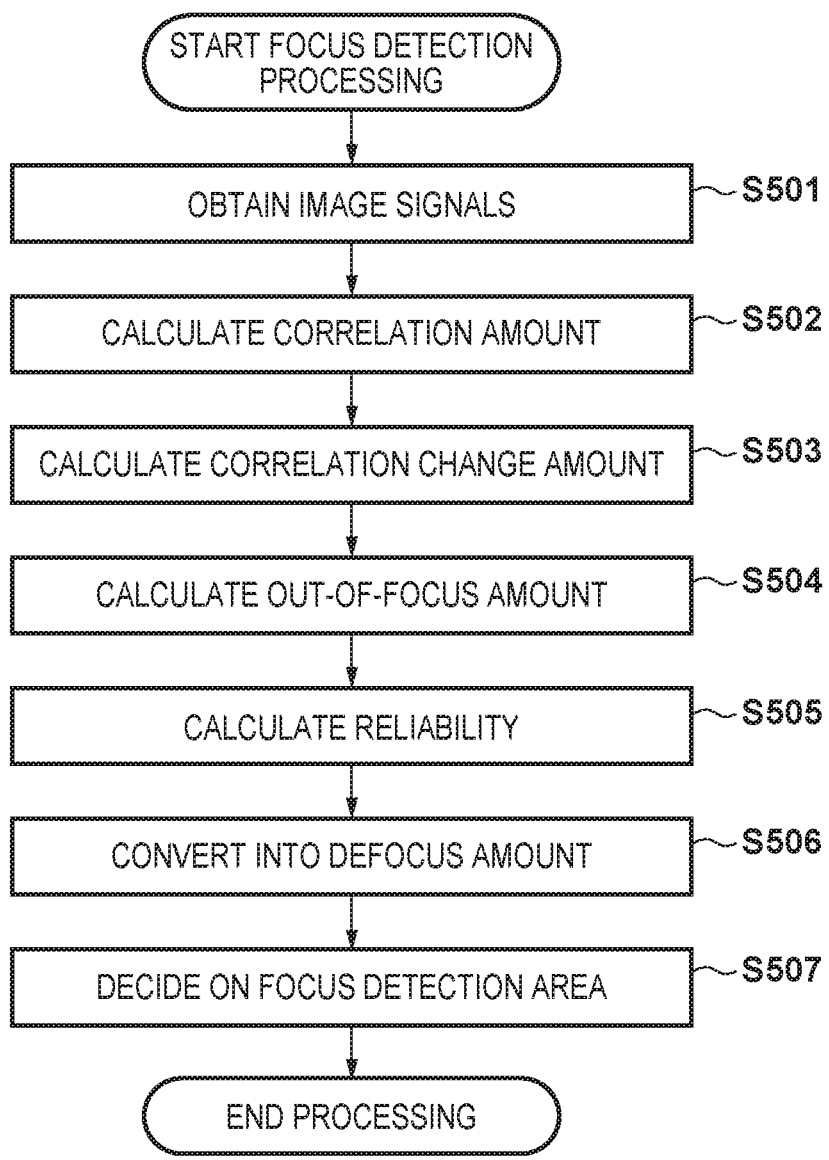
FIG. 5 is a flowchart showing a sequence of operations of focus detection processing according to the present embodiment.

The focus detection processing in step S401 will now be described with reference to FIG. 5. FIG. 5 is a flowchart showing the focus detection processing. First, in step S501, the focus detection signal processing unit 204 obtains a pair of image signals from a set focus detection range (AF frame, focus detection frame). Next, in step S502, the focus detection signal processing unit 204 calculates a correlation amount from the pair of image signal obtained in step S501.

In step S503, the focus detection signal processing unit 204 calculates a correlation change amount based on the correlation amount calculated in step S502. In step S504, an out-of-focus amount is calculated based on the correlation change amount calculated in step S503.

In step S505, the focus detection signal processing unit 204 calculates reliability indicating how reliable the out-of-focus amount calculated in step S504 is. Note that the focus detection signal processing unit 204 executes this processing for calculating reliability for every individual focus detection area within the focus detection range.

In step S506, the focus detection signal processing unit 204 converts the out-of-focus amount into a defocus amount for each individual focus detection area. Finally, in step S507, the camera control unit 207 decides on a focus detection area used in the AF processing, and then ends the focus detection processing sequence. Note that processing in step S507 is executed only during AF, and skipped while manipulating MF.

With reference to FIGS. 13A to 13C and 14A to 14D, the following provides a more detailed description of the focus detection processing illustrated in FIG. 5.

Figure 13A:
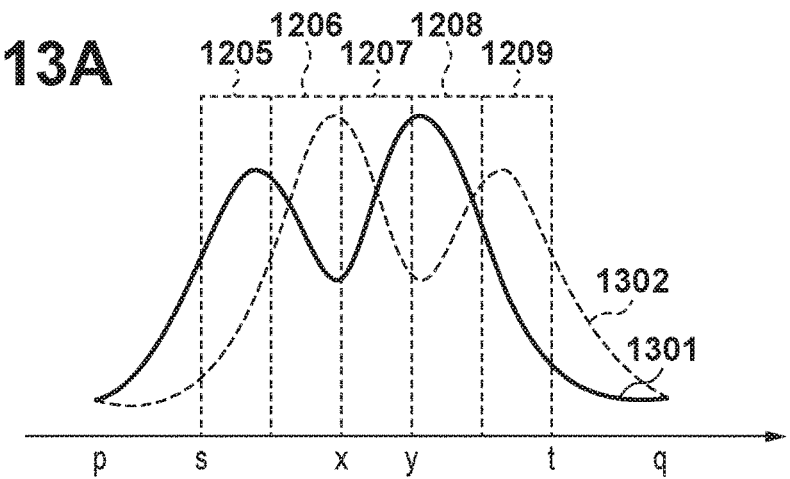
FIGS. 13A to 13C show image signals obtained from focus detection areas according to the present embodiment.
Figure 13B:
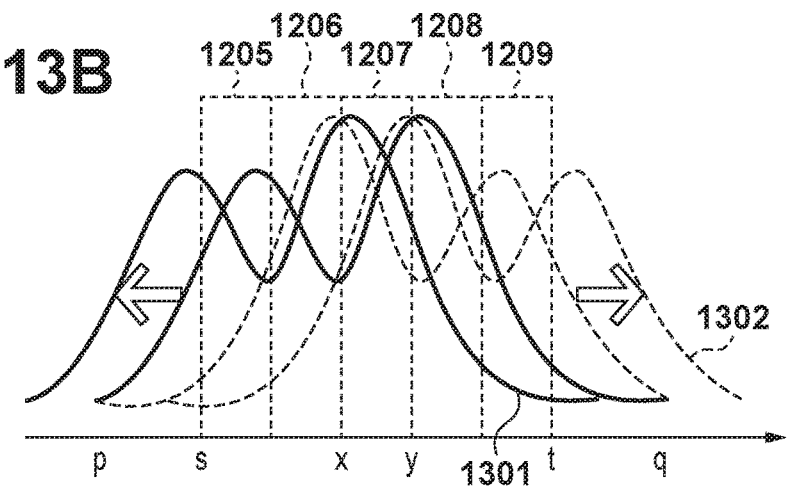
Figure 13C:
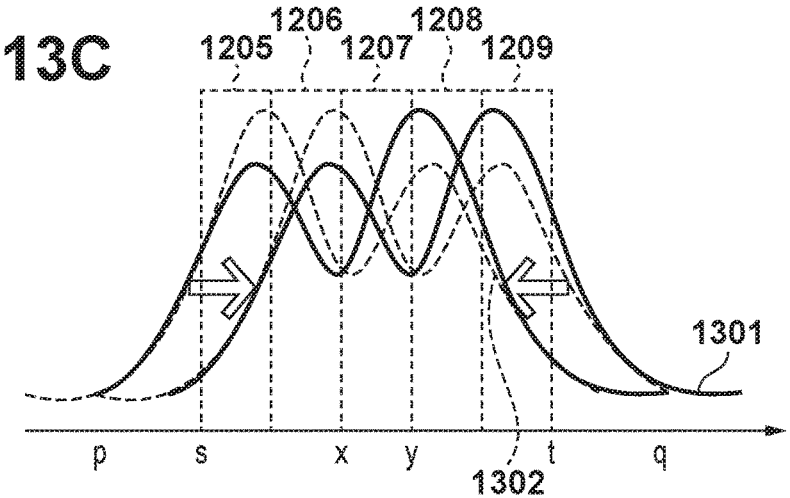

FIGS. 13A to 13C show examples of image signals obtained from the focus detection range 1202 shown in FIG. 12B. A horizontal axis indicates, for example, positions of the image signals in the horizontal direction. That it so say, the focus detection range 1202 shown in FIG. 12B extends from s to t, and an area obtained by adding the same and the shift areas 1203 necessary for correlation computation extends from p to q. The shift areas are the ranges necessary for focus detection computation that takes shift amounts into consideration. One of the focus detection areas 1205 to 1209 shown in FIG. 12B extends from x to y, and an area obtained by adding all of the focus detection areas 1205 to 1209 serves as the focus detection range 1202.

FIG. 13A shows waveforms of pre-shift image signals. A solid line 1301 denotes an image signal A, and a dash line 1302 denotes an image signal B. FIG. 13B shows examples of image waveforms obtained by shifting each image waveform shown in FIG. 13A in a positive direction, whereas FIG. 13C shows examples of image waveforms obtained by shifting each image waveform shown in FIG. 13A in a negative direction. That is to say, to calculate correlation amounts, the AF signal processing unit 204 shifts each of the image signal A 1301 and the image signal B 1302, bit by bit, in the direction of a corresponding arrow.

A description is now given of processing for calculating correlation amounts COR. The focus detection signal processing unit 204 shifts the obtained image signal A and image signal B bit by bit as illustrated in FIGS. 13B and 13C, and calculates a sum of absolute values of differences between the shifted image signal A and image signal B. A shift amount is expressed as i, the smallest shift amount is p−s shown in FIGS. 13A to 13C, and the largest shift amount is q−t shown in FIGS. 13A to 13C. Also, x represents the coordinates at which a focus detection area starts, and y represents the coordinates at which the focus detection area ends. With the foregoing elements, the correlation amounts COR can be calculated using the following Expression 1.

$$COR[i] = \sum_{k=x}^{y} |A[k+i] - B[k-i]| \quad \text{Expression 1}$$

$$\{(p-s) < i < (q-t)\}$$

The obtained correlation amounts COR have a waveform shown in FIG. 14A, for example. In the graph, a horizontal axis indicates the shift amounts, whereas a vertical axis indicates the correlation amounts. The correlation amounts COR have a correlation amount waveform 1401, in which 1402 and 1403 indicate the vicinities of extrema of correlation values. In the exemplary case of the correlation amount waveform 1401, the smaller a correlation amount, the higher a degree of match between an A image and a B image.

Next, based on the obtained correlation amounts COR, correlation change amounts ΔCOR are calculated. More specifically, the focus detection signal processing unit 204 calculates a correlation change amount from a difference between correlation amounts that have an interval of one shift among the obtained correlation amounts (i.e., the correlation amounts shown in FIG. 14A). Provided that a shift amount is expressed as i, the smallest shift amount is p−s shown in FIGS. 13A to 13C, and the largest shift amount is q−t shown in FIGS. 13A to 13C, the correlation change amounts ΔCOR can be calculated using the following Expression 2.

$$\Delta COR[i] = COR[i-1] - COR[i+1]\{(p-s+1)<i<(q-t-1)\} \quad \text{Expression 2}$$

The correlation change amounts ΔCOR thus obtained have a waveform shown in FIG. 14B, for example. Here, a horizontal axis indicates the shift amounts, whereas a vertical axis indicates the correlation change amounts. The correlation change amounts ΔCOR have a correlation change amount waveform 1404, and the sign of the correlation change amounts changes from positive to negative in the vicinities of shift amounts 1405 and 1406. A correlation change amount of zero at 1405 (this state is referred to as a zero-crossing) gives the A image and the B image the highest degree of match, and thus a shift amount corresponding thereto can be used as an out-of-focus amount.

Processing for calculating this out-of-focus amount (PRD) will now be described in more detail. FIG. 14C is an enlarged view of the vicinity of 1405 shown in FIG. 14B. A portion of the correlation change amount waveform 1404 is enlarged and presented as 1407, and a shift amount at a zero-crossing is indicated by a point C. First of all, the out-of-focus amount (i.e., the position of the point C) is divided into an integer part β and a decimal part α. The decimal part α can be calculated based on a similarity relationship between a triangle ABC and a triangle ADE shown in FIG. 14C, using the following Expression 3.

$$AB:AD = BC:DE \quad \text{Expression 3}$$

$$\Delta COR[k-1]:\Delta COR[k-1] - \Delta COR[k] =$$

$$\alpha:k-(k-1)$$

$$\alpha = \frac{\Delta COR[k-1]}{\Delta COR[k-1] - \Delta COR[k]}$$

On the other hand, as shown in FIG. 14C, the integer part β can be calculated using the following Expression 4.

$$\beta = k-1 \quad \text{Expression 4}$$

As described above, the focus detection signal processing unit 204 can calculate the out-of-focus amount PRD from a sum of α and β.

When there are multiple zero-crossings as shown in FIG. 14B, a shift amount corresponding to a zero-crossing exhibiting a change in correlation amounts with greater steepness, max der (hereinafter referred to as steepness), can be used as a superior zero-crossing. The steepness can be used as an index showing how easily focus detection is performed, and the steepness having a larger value indicates that focus detection is more easily performed. The steepness can be calculated using the following Expression 5.

$$\text{max der} = |\Delta COR[k-1]| + |\Delta COR[k]| \quad \text{Expression 5}$$

As described above, when there are multiple zero-crossings, a first zero-crossing (that is to say, a superior zero-crossing) can be decided on by calculating the steepness.

A description is now given of the processing for calculating the reliability of an out-of-focus amount. The reliability of an out-of-focus amount can be defined using, for example, the aforementioned steepness and fnclvl, which is a degree of match between two images, that is to say, the image signal A and the image signal B (hereinafter referred to as an image match degree). Therefore, the reliability of an out-of-focus amount can be rephrased as the reliability of image signals. An image match degree can be used as an index showing the precision of an out-of-focus amount; the smaller the value of an image match degree, the higher the precision.

An image match degree can be calculated using a change in correlation amounts (that is to say, a correlation change amount ΔCOR) per unit shift amount, and such a correlation change amount is shown in, for example, FIG. 14D which is an enlarged view of 1402 shown in FIG. 14A. Note that 1408 is a part of the correlation amount waveform 1401. The focus detection signal processing unit 204 can calculate an image match degree using the following Expression 6.

(i) when $|\Delta COR[k-1]|\times 2 \leq \max \text{ der } \textit{fnclvl} = COR[k-1] + \Delta COR[k-1]/4$ (ii) when $|\Delta COR[k-1]|\times 2 > \max \text{ der } \textit{fnlcl} = COR[k] - \Delta COR[k]/4$   Expression 6

<AF Reactivation Determination Processing (Step S404)>

Figure 6:
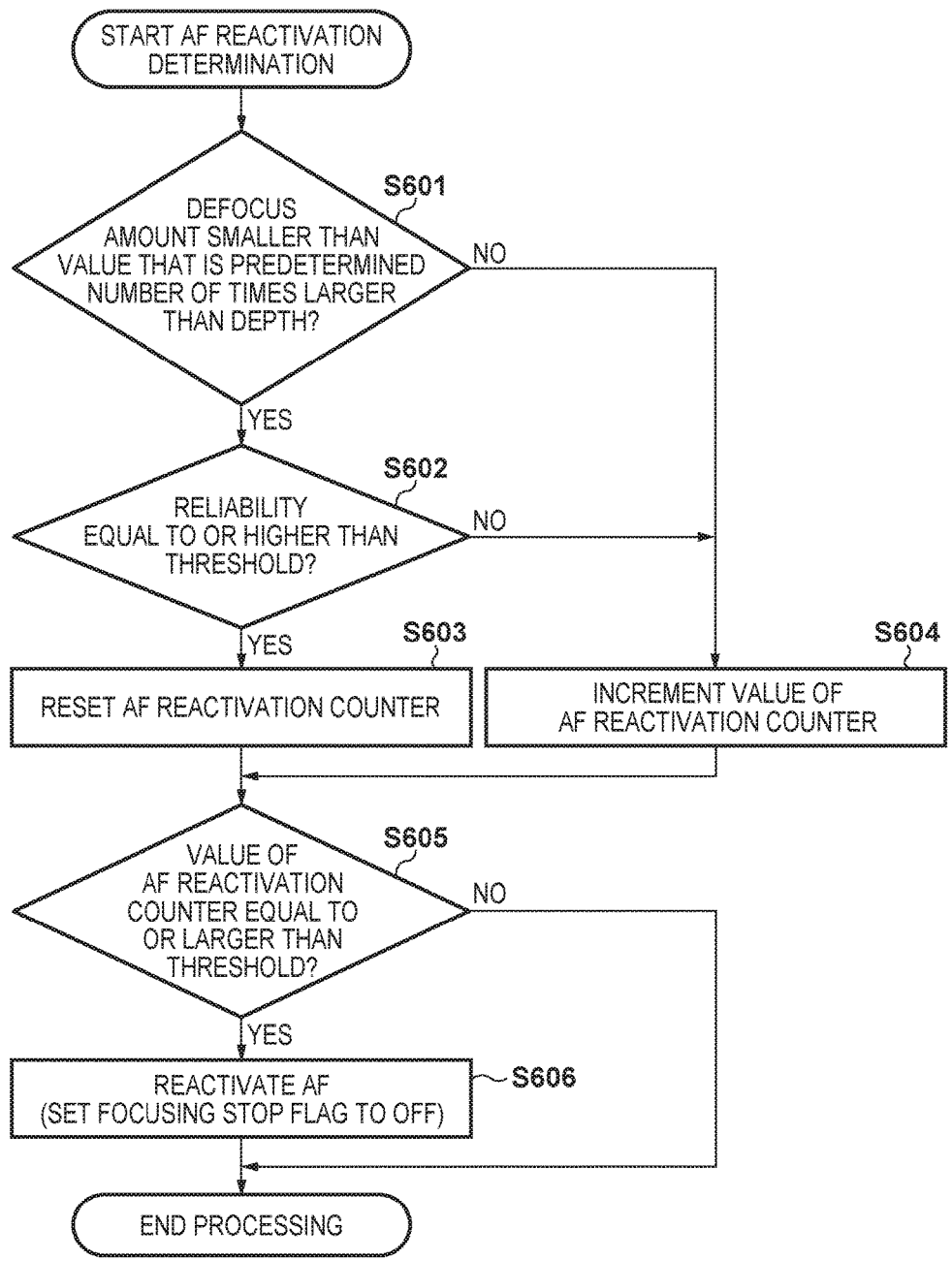
FIG. 6 is a flowchart showing a sequence of operations of AF reactivation determination processing according to the present embodiment.

A description is now given of a sequence of operations of the AF reactivation determination processing in step S404 with reference to a flowchart of FIG. 6. FIG. 6 is a flowchart showing the AF reactivation determination processing. The AF reactivation determination processing is processing for determining whether to drive the focus lens again in an in-focus state with the focus lens being stopped. When a defocus amount is larger than a predetermined value, or when reliability is lower than a predetermined value, there is a possibility that a main subject being captured has changed. In view of this, a counter for controlling reactivation of AF (AF reactivation counter) is provided, and if there is a possibility that the main subject has changed, reactivation of AF is prepared by incrementing a value of the AF reactivation counter in the AF reactivation determination processing. On the other hand, when a detected defocus amount is smaller than the predetermined value and high reliability is maintained, the AF reactivation counter is reset so as to maintain the focus lens in the stopped state. Below is a specific description of the steps in the flowchart of FIG. 6.

In step S601, the camera control unit 207 determines whether the defocus amount calculated by the focus detection signal processing unit 204 is smaller than a threshold (e.g., a value that is a predetermined number of times larger than a depth). The camera control unit 207 proceeds to step S602 if the defocus amount is smaller than the threshold, and proceeds to step S604 if the defocus amount is larger than or equal to the threshold.

In step S602, the camera control unit 207 determines whether the reliability calculated in step S505 is higher than or equal to a threshold. The camera control unit 207 proceeds to step S603 if the calculated reliability is higher than or equal to the threshold, and proceeds to step S604 if the calculated reliability is lower than the threshold.

The camera control unit 207 resets the AF reactivation counter in step S603, or increments the value of the AF reactivation counter in step S604, and then processing proceeds to step S605.

In step S605, the camera control unit 207 determines whether the value of the AF reactivation counter is larger than or equal to a threshold for AF reactivation. If the value of the AF reactivation counter is larger than or equal to the threshold for AF reactivation, processing proceeds to step S606, and if the value of the AF reactivation counter is smaller than the threshold for AF reactivation, the sequence of processing for determining AF reactivation is ended. In step S606, the camera control unit 207 sets the focusing stop flag to OFF. In this way, AF is reactivated, and driving of the focus lens can be started again. Thereafter, the camera control unit 207 ends the sequence of operations.

Note that the threshold for the defocus amount set in step S601 (the value that is a predetermined number of times larger than the depth) can be adjusted as appropriate so as to enable easy reactivation when the main subject has changed, and make inadvertent reactivation less likely to occur when the main subject has not changed. For example, the threshold can be set to be equivalent to a depth with which the out-of-focus state of the main subject is visible. The threshold for the reliability may be set in step S602 in such a manner that, for example, the harder it is to rely on the defocus direction, the smaller the set value of the reliability is. In this way, the main subject can be assumed to have changed with the use of the threshold for the reliability. As described above, the thresholds set in steps S601 and S602 can be adjusted as appropriate depending on how the change in the main subject is determined.

<AF Processing (Step S403)>

Figure 7:
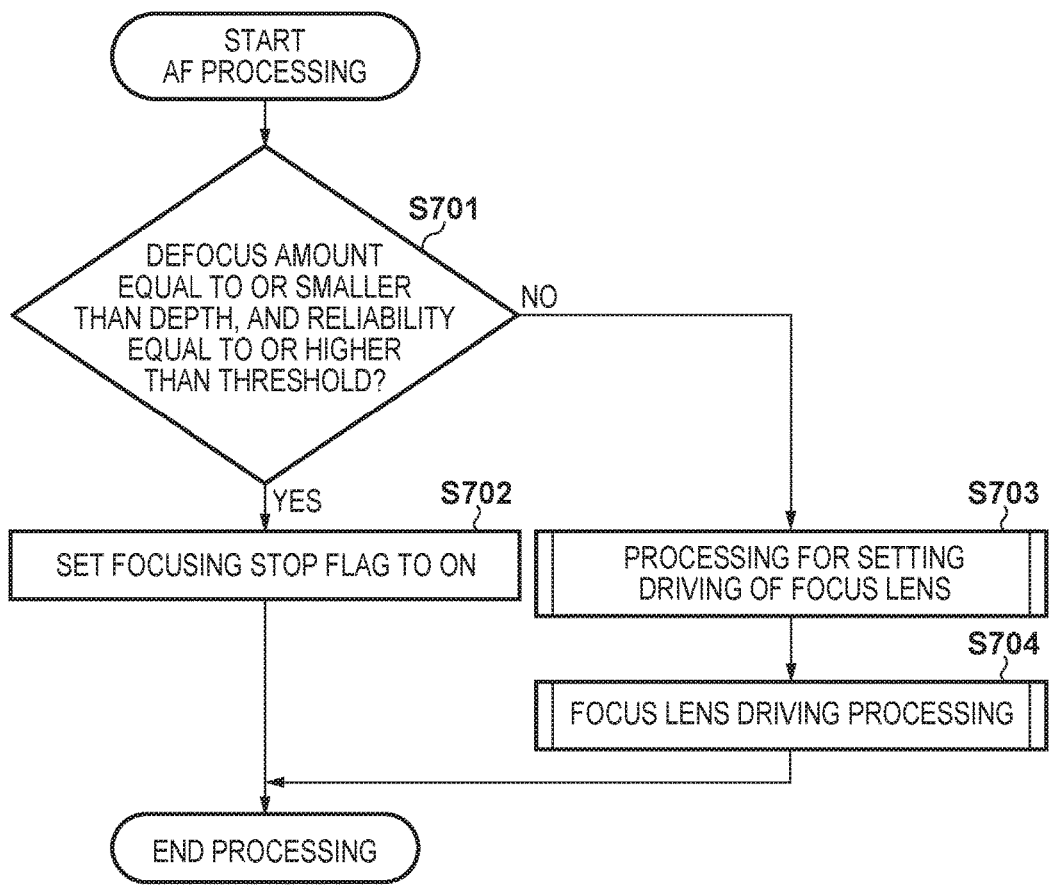
FIG. 7 is a flowchart showing a sequence of operations of AF processing according to the present embodiment.

The following describes a sequence of operations of the AF processing in step S403 with reference to a flowchart of FIG. 7. The AF processing is processing for making a determination about driving of the focus lens and cessation of focusing in a state where focusing is not stopped.

In step S701, the camera control unit 207 determines whether the following conditions are satisfied: the defocus amount is smaller than or equal to the depth, and the reliability calculated in step S505 shown in FIG. 5 is higher than or equal to a threshold. If these conditions are satisfied, processing proceeds to step S702, and if not, processing proceeds to step S703. Although the threshold used in step S701 is, for example, equivalent to the depth in the description of the present embodiment, the threshold can be increased or reduced as necessary.

In step S702, the camera control unit 207 sets the focusing stop flag to ON, and then ends the AF processing sequence. As described above, when a subject is determined to be in focus, a transition is made from the state where the focus lens is driven to the state where the focus lens is stopped, and then the reactivation determination is made in step S409 shown in FIG. 4, i.e., whether to drive the focus lens again is determined.

On the other hand, in step S703, the camera control unit 207 sets driving of the focus lens. Here, a driving speed and a driving method of the focus lens are decided on, as will be described later in detail with reference to FIG. 8, and in step S704, focus lens driving processing is executed in accordance with the settings that were decided on in step S703. Upon completion of the focus lens driving processing, the camera control unit 207 ends the AF processing sequence. The details of the focus lens driving processing in step S704 will be described later with reference to FIG. 9.

<Processing for Setting Driving of Focus Lens (Step S703)>

Figure 8:
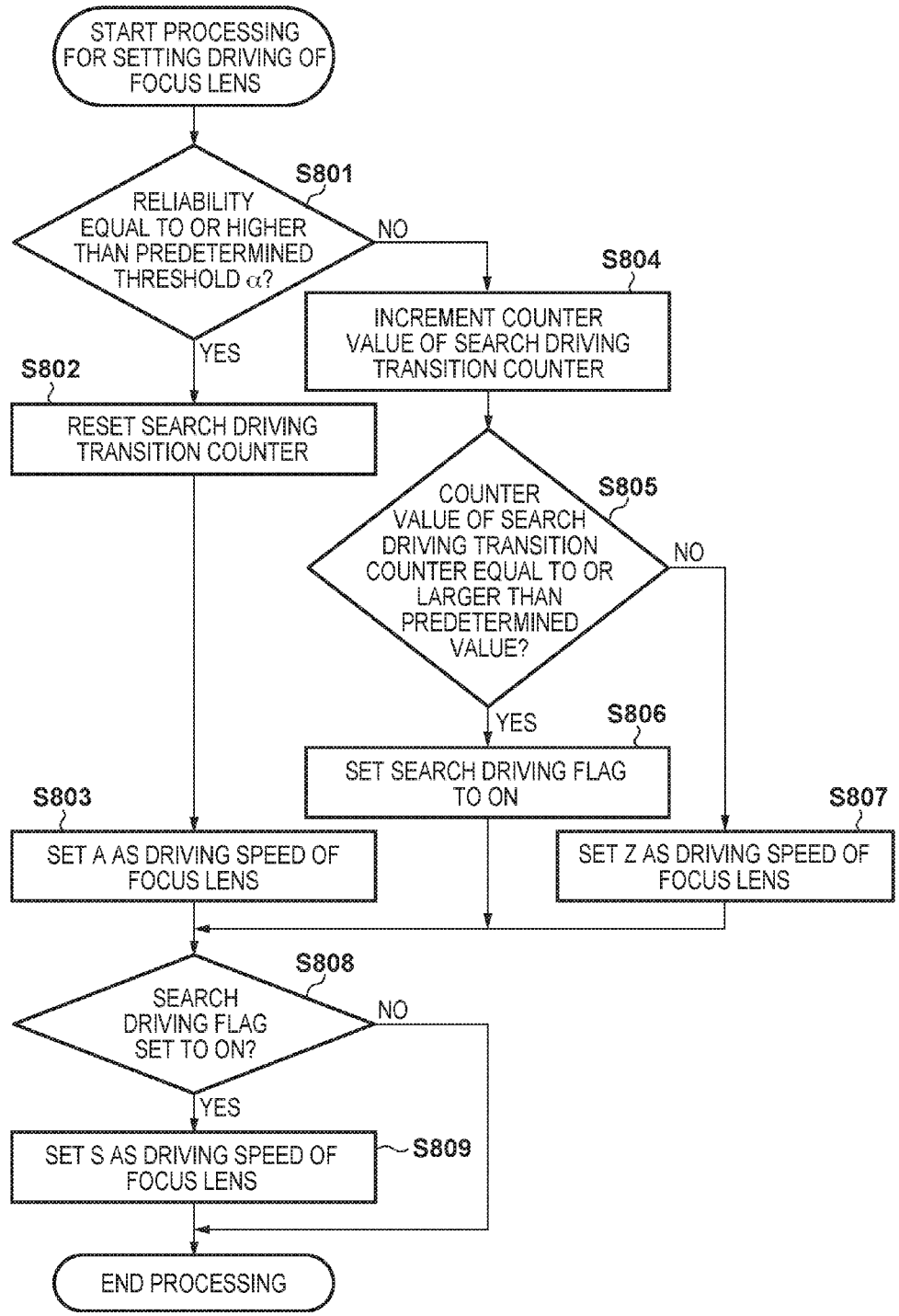
FIG. 8 is a flowchart showing a sequence of operations of processing for setting driving of a focus lens according to the present embodiment.

With reference to a flowchart of FIG. 8, a description is now given of a sequence of operations of the processing for setting driving of the focus lens in step S703. In the processing for setting driving of the focus lens, a determination is made about a transition to the above-described search driving in accordance with the reliability of an out-of-focus amount, and a driving speed at which the focus lens is driven is set in accordance with the reliability of the out-of-focus amount.

In step S801, the camera control unit 207 determines whether the reliability is higher than or equal to a predetermined threshold α; if the reliability is higher than or equal to the predetermined threshold α, processing proceeds to step S802, and if the reliability is lower than the predetermined threshold, processing proceeds to step S804. In step S802, the camera control unit 207 resets a search driving counter to, for example, 0, and then proceeds to step S803.

In step S803, the camera control unit 207 sets a predetermined speed A as the driving speed of the focus lens, and then proceeds to step S808.

Next, in step S804, the camera control unit 207 increments a counter value of a search driving transition counter for determining whether a low-reliability state has continued. For example, the counter value is incremented by one, and then processing proceeds to step S805. In step S805, whether the counter value of the search driving transition counter is larger than or equal to a predetermined value is determined; if the counter value is larger than or equal to the predetermined value, processing proceeds to step S806, and if the counter value is not larger than or equal to the predetermined value, processing proceeds to step S807.

In step S806, as it is determined that the low-reliability state has continued, the camera control unit 207 sets the search driving flag to ON to perform search driving, and then proceeds to step S808. On the other hand, in step S807, as it is determined that the counter value of the search driving transition counter is not larger than or equal to the predetermined value, i.e., the low-reliability state has not continued, the camera control unit 207 sets a speed Z as the driving speed of the focus lens. Thereafter, processing proceeds to step S808.

In step S808, the camera control unit 207 determines whether the search driving flag is set to ON after processing in steps S803, S806, and S807; if the search driving flag is set to ON, processing proceeds to step S809, and if the search driving flag is not set to ON, the processing for setting driving of the focus lens is ended. In step S809, a driving speed S for search driving is set, and the processing sequence for setting driving of the focus lens is ended.

Note that the threshold α for reliability, which is used in step S801, is set to have a value that makes at least the defocus direction reliable. When the defocus direction is reliable, the focus lens is driven at the set driving speed A based on the defocus amount.

In the present processing for setting driving of the focus lens, the search driving flag is set so as to perform search driving when an unreliable state of the direction of the defocus amount has continued. In the present embodiment, search driving is performed using a driving method in which the defocus direction is set independently of the defocus amount, and the focus lens is driven at a set speed in the defocus direction. For example, if the direction of the defocus amount is not reliable in step S801, the counter value of the search driving transition counter is incremented in step S804. Therefore, by determining whether the counter value of the search driving transition counter has reached or exceeded the predetermined value in step S805, it is possible to determine whether there is a possibility that the subject is out of focus due to a continued low-reliability state, and search driving is performed only if there is such a possibility. As a search driving method does not use the defocus amount, low-quality focusing may be performed, which temporarily causes a significantly out-of-focus state. In view of this, in the present embodiment, whether or not there is continuity is determined so as to prevent an immediate transition to search driving after a decline in the reliability. This can prevent inadvertent execution of search driving attributed to hypersensitive reaction to the influences of noise and the like. Furthermore, if the reliability reaches or exceeds the predetermined threshold α in the course of incrementing the counter value of the search driving transition counter for determining whether to make a transition to search driving (e.g., in steps S804 and S805), the search driving transition counter is reset in step S802.

Note that the driving speed S for search driving is set to be higher than the driving speed A in step S809, whereas the driving speed Z is set to be, for example, extremely low or zero in step S807. That is to say, the driving speeds of the focus lens set in FIG. 8 satisfy the following relationship: the driving speed Z<the driving speed A<the driving speed S. During search driving, the subject is expected to be signifi-cantly out of focus, and it is necessary to quickly bring the subject into focus; this is why the driving speed S is set to be higher than the driving speed A in step S809. Furthermore, when a determination is made about a transition to search driving based on the search driving transition counter in step S805 as the reliability of the out-of-focus amount is lower than the threshold α, the precision of defocus detection is low, and therefore inadvertent lens driving may trigger low-quality focusing. For this reason, the driving speed Z is set to be extremely low or zero in step S807 so as to prevent a low-quality focusing operation in a low-reliability state.

<Focus Lens Driving Processing (Step S704)>

Figure 9:
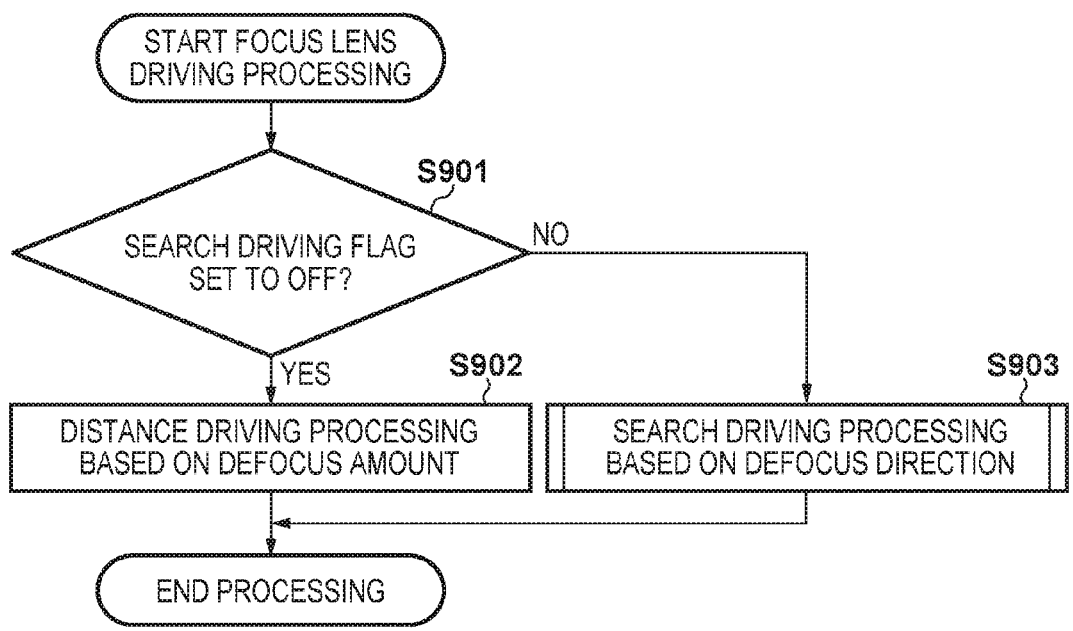
FIG. 9 is a flowchart showing a sequence of operations of focus lens driving processing according to the present embodiment.

With reference to a flowchart of FIG. 9, a description is now given of a sequence of operations of the focus lens driving processing in step S704. In step S901, the camera control unit 207 determines the state of the search driving flag set in the processing for setting driving of the focus lens (ON or OFF). If the search driving flag is set to OFF, search driving need not be performed, and thus processing proceeds to step S902; if the search driving flag is set to ON, processing proceeds to step S903 to perform search driving.

In step S902, the camera control unit 207 performs distance driving based on the defocus amount that has been calculated according to the phase-difference detection method using image signals. Upon completion of distance driving, the camera control unit 207 ends the lens driving processing. In this processing for distance driving, the focus lens is driven by an amount equivalent to the calculated defocus amount. For example, the defocus amount calculated by the camera control unit 207 is converted into a driving amount of the focus lens 103, and a driving command based on the converted driving amount is issued to the focus lens driving unit 105. On the other hand, in step S903, later-described search driving is performed based on the defocus direction. Once the camera control unit 207 has performed search driving, it ends the processing sequence for driving the focus lens.

<Search Driving Processing (Step S903)>

Figure 10:
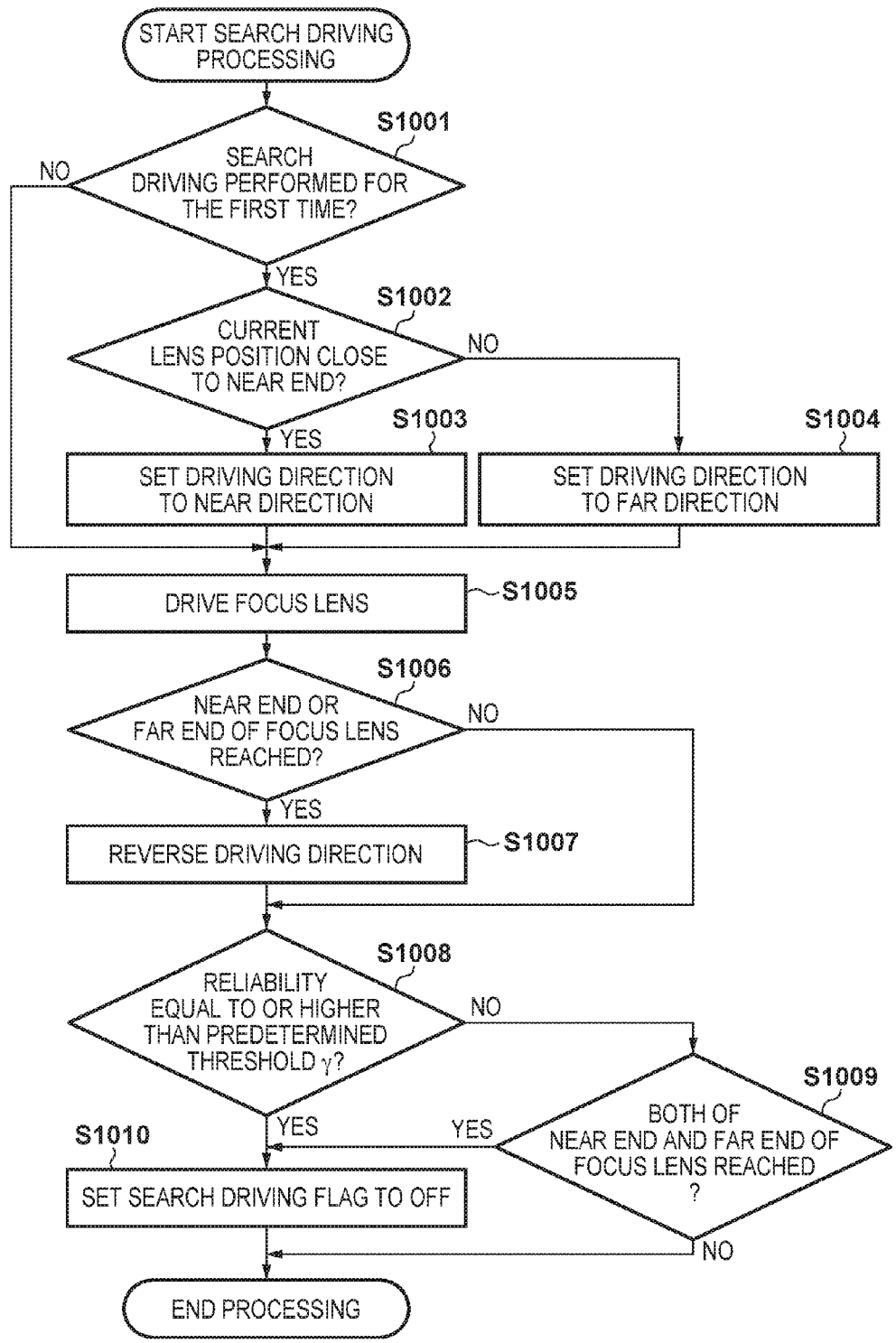
FIG. 10 is a flowchart showing a sequence of operations of search driving processing according to the present embodiment.

With reference to a flowchart of FIG. 10, a description is now given of a sequence of operations of the search driving processing in step S903. In the search driving processing, a driving direction is set if search driving is performed for the first time, and the focus lens is driven until a later-described condition for ending search driving is satisfied.

In step S1001, the camera control unit 207 determines whether search driving is performed for the first time. If search driving is performed for the first time, processing proceeds to step S1002, and if search driving is not performed for the first time, processing proceeds to step S1005.

Below-described steps S1002 to S1004 represent processing for setting a driving direction as search driving is performed for the first time. In step S1002, the camera control unit 207 determines whether the current lens position is close to a near end. If the current lens position is close to the near end, processing proceeds to step S1003, and if the current lens position is close to a far end, processing proceeds to step S1004. In step S1003, the camera control unit 207 sets a near direction as the driving direction of the focus lens at the start of search driving. On the other hand, in step S1004, it sets a far direction as the driving direction of the focus lens at the start of search driving. Setting the driving direction in the foregoing manner can reduce a time period of search driving across the entire driving area of the focus lens, and also reduce the maximum time period required to find an in-focus position through search driving.

Once the camera control unit 207 has set the driving direction of the focus lens, processing proceeds to step S1005.

In step S1005, the camera control unit 207 starts control to drive the focus lens based on the set driving direction and driving speed. In step S1006, the camera control unit 207 determines whether the focus lens has reached the near end or the far end. If the focus lens has reached one of the ends, processing proceeds to step S1007, and if the focus lens has not reached one of the ends, processing proceeds to step S1008. In step S1007, the camera control unit 207 reverses the driving direction of the focus lens.

In step S1008, the camera control unit 207 determines whether reliability is higher than or equal to a predetermined threshold $\gamma$. If reliability is higher than or equal to the predetermined threshold $\gamma$, processing proceeds to step S1010, and if not, processing proceeds to step S1009. In step S1009, the camera control unit 207 determines whether the focus lens has reached both of the near end and the far end; if the focus lens has reached both ends, processing proceeds to step S1010, and if the focus lens has not reached both ends, the search driving processing sequence is ended. In step S1010, the camera control unit 207 sets the search driving flag to OFF to end search driving. Thereafter, the camera control unit 207 ends the search driving processing sequence.

In the present embodiment, the condition for ending search driving is that reliability is higher than or equal to the predetermined threshold $\gamma$ in step S1008, or that both of the near end and the far end of the focus lens have been reached in step S1009. The threshold $\gamma$ for reliability, which is set in step S1008, indicates that at least the defocus amount calculated based on a phase difference between image signals is reliable, similarly to the threshold $\alpha$ set in step S801 shown in FIG. 9. If reliability is higher than or equal to the threshold $\gamma$, it can be determined that the current position is close to the in-focus position, and thus the camera control unit 207 can stop search driving and switch again to control for distance driving based on the defocus amount (step S902). Furthermore, if both of the near end and the far end have been reached in step S1009, it could possibly mean that a subject was not able to be specified after driving across the entire focus driving area. In this case, the camera control unit 207 sets the search driving flag to OFF to restore the state before the start of search driving. When a subject is not able to be specified in a manner different from the present embodiment, control may be performed to continue search driving without setting the search driving flag to OFF.

As described above, in the present embodiment, upon switching from AF to MF, an AF frame set for AF is segmentalized for MF (that is to say, a plurality of areas are set within an AF focus detection area). Then, in-focus degrees are determined in one-to-one correspondence with focus detection frames of the segment areas, and in-focus display is performed based on an area that is in focus. Such in-focus display enables the user to bring more detailed areas into focus, on an area-by-area basis, during MF.

Furthermore, in-focus display is performed with respect to an enlarged area by combining adjacent focus detection frames among the plurality of focus detection frames obtained through segmentalization. This makes it possible to prevent a plurality of adjacent frames from obstructing a subject, and perform in-focus display with increased visibility. That is to say, a specific subject or a specific location of a subject can be brought into precise focus more smoothly.

Furthermore, upon switching from MF to AF, an AF frame is set based on a focus detection frame that was in focus while manipulating MF, and tracking is performed according to AF. In this way, a subject intended by the user can be continuously brought into focus. Moreover, when it is determined that a subject being tracked has changed within an AF frame, or that the subject has moved to the outside of the AF frame, the AF frame is restored to a normal size set for AF. This can increase the precision of focus detection through AF, and enables appropriate AF operations.

As described above, the present invention enables appropriate focus control in accordance with the user's intention when there are a manual focus control mode and an automatic focus control mode.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Examples of a storage medium for providing program codes include a flexible disk, a hard disk, an optical disc, and a magneto-optical disc. Other examples include a CD-ROM, a CD-R, a CD-RW, a DVD-ROM, a DVD-RAM, a DVD-RW, a DVD-R, a magnetic tape, a nonvolatile memory card, and a ROM. The functions of each of the above-described embodiment(s) are realized by enabling execution of the program codes read out by the computer. In an alternative case, an operating system (OS) and the like running on the computer executes a part or all of actual processing based on instructions of the program codes, and the functions of each of the above-described embodiment(s) are realized by such processing. The following alternative case is also possible. First, the program codes read out from the storage medium are written to a memory provided to a function expansion board inserted into the computer or a function expansion unit connected to the computer. Thereafter, based on the instructions of the program codes, a CPU or the like of the function expansion board or the function expansion unit execute a part or all of actual processing.

While the present invention has been described with reference to exemplary embodiment(s), it is to be understood that the invention is not limited to the disclosed exemplary embodiment(s). The scope of the following claims is to be accorded the broadest interpretation so as to encompass all such modifications and equivalent structures and functions.

This application claims the benefit of Japanese Patent Application No. 2015-086209, filed Apr. 20, 2015, which is hereby incorporated by reference herein its entirety.

What is claimed is:

1. A focus control apparatus having a first mode in which a position of a focus lens is automatically changed, and a second mode in which the position of the focus lens is manually changed, the focus control apparatus comprising:
   a setting unit configured to set a first area in the first mode and a second area in the second mode, as areas for obtaining signals used in focus detection;
   a focus detection unit configured to detect a focus state based on signals output from areas of an image capturing unit that correspond to the first area and the second area; and
   a focus control unit configured to control the position of the focus lens in the first mode based on the focus state of the first area detected by the focus detection unit,
   wherein
   upon switching from the first mode to the second mode, the setting unit sets a plurality of the second areas that are each smaller than the first area set in the first mode, and
   upon switching from the second mode to the first mode again, the setting unit sets the first area based on a second area that is included among the plurality of second areas and that has been determined to be in an in-focus state.

2. The apparatus according to claim 1,
   wherein
   upon switching from the first mode to the second mode, the setting unit sets the plurality of second areas within the first area set in the first mode.

3. The apparatus according to claim 1,
   wherein
   upon switching from the second mode to the first mode, when a predetermined condition is satisfied, the setting unit sets the first area in a third area that is larger than the second area that has been determined to be in the in-focus state.

4. The apparatus according to claim 3,
   wherein
   the third area includes the second area that has been determined to be in the in-focus state.

5. The apparatus according to claim 3,
   wherein
   the predetermined condition is satisfied when a difference between the position of the focus lens before switching from the second mode to the first mode and the position of the focus lens after switching from the second mode to the first mode is larger than or equal to a first threshold.

6. The apparatus according to claim 3,
   wherein
   the predetermined condition is satisfied when a change in the focus state detected in the third area is larger than or equal to a second threshold.

7. The apparatus according to claim 3,
   wherein
   the predetermined condition is satisfied when a change in an image capturing condition has been detected, the image capturing condition including at least one of a movement of the focus control apparatus, a focal length, and brightness.

8. The apparatus according to claim 1, further comprising a display control unit configured to display an image obtained by the image capturing unit on a display unit,
   wherein
   in the second mode, the display control unit displays a content indicating the second area that has been determined to be in the in-focus state in such a manner that the content is superimposed over the image.

9. The apparatus according to claim 8,
   wherein
   in the second mode, when a plurality of the second area has been determined to be in the in-focus state and the plurality of second areas are adjacent, the display control unit combines the plurality of second areas, and displays the combined second areas as one area.

10. The apparatus according to claim 1,
    wherein
    the focus detection unit detects a defocus amount, and the area is determined to be in the in-focus state when the detected defocus amount is smaller than or equal to a predetermined value.

11. An image capturing apparatus, comprising:
    an image capturing unit; and
    a focus control apparatus having a first mode in which a position of a focus lens is automatically changed, and a second mode in which the position of the focus lens is manually changed,
    wherein
    the focus control apparatus includes:
       a setting unit configured to set a first area in the first mode and a second area in the second mode, as areas for obtaining signals used in focus detection;
       a focus detection unit configured to detect a focus state based on signals output from areas of the image capturing unit that correspond to the first area and the second area; and
       a focus control unit configured to control the position of the focus lens in the first mode based on the focus state of the first area detected by the focus detection unit,
    upon switching from the first mode to the second mode, the setting unit sets a plurality of the second areas that are each smaller than the first area set in the first mode,
    upon switching from the second mode to the first mode again, the setting unit sets the first area based on a second area that is included among the plurality of second areas and that has been determined to be in an in-focus state,
    the image capturing unit includes a plurality of pixels, each pixel having a plurality of photoelectric conversion areas corresponding to one microlens, and
    the focus detection unit detects the focus state based on signal pairs that are each output from a different one of the photoelectric conversion areas in the plurality of pixels.

12. A control method of a focus control apparatus having a first mode in which a position of a focus lens is automatically changed, and a second mode in which the position of the focus lens is manually changed, the control method comprising:
    setting a first area in the first mode and a second area in the second mode, as areas for obtaining signals used in focus detection;

detecting a focus state based on signals output from areas of an image capturing unit that correspond to the first area and the second area; and controlling the position of the focus lens in the first mode based on the detected focus state of the first area, wherein upon switching from the first mode to the second mode, a plurality of the second areas are set, the plurality of second areas each being smaller than the first area set in the first mode, and upon switching from the second mode to the first mode again, the first area is set based on a second area that is included among the plurality of second areas and that has been determined to be in an in-focus state.

13. A non-transitory computer-readable storage medium storing a program for causing a computer to execute a control method of a focus control apparatus having a first mode in which a position of a focus lens is automatically changed, and a second mode in which the position of the focus lens is manually changed, the control method comprising:

setting a first area in the first mode and a second area in the second mode, as areas for obtaining signals used in focus detection;

detecting a focus state based on signals output from areas of an image capturing unit that correspond to the first area and the second area; and controlling the position of the focus lens in the first mode based on the detected focus state of the first area, wherein upon switching from the first mode to the second mode, a plurality of the second areas are set, the plurality of second areas each being smaller than the first area set in the first mode, and upon switching from the second mode to the first mode again, the first area is set based on a second area that is included among the plurality of second areas and that has been determined to be in an in-focus state.

* * * * *